(12) United States Patent
Strong et al.

(10) Patent No.: US 8,523,202 B1
(45) Date of Patent: Sep. 3, 2013

(54) TRAILING AXLE SUSPENSION SYSTEM

(76) Inventors: Brooks Strong, Houston, TX (US);
Joshua Cayne Fisher, Montgomery, TX (US)

( * ) Notice: Subject to any disclaimer, the term of this patent is extended or adjusted under 35 U.S.C. 154(b) by 0 days.

(21) Appl. No.: 13/449,067

(22) Filed: May 7, 2012

(51) Int. Cl.
*B62D 61/12* (2006.01)

(52) U.S. Cl.
USPC .................. 280/86.5; 180/24.02; 180/209

(58) Field of Classification Search
USPC ............... 180/22, 24.02, 209; 280/43.13, 280/43.17, 43.23, 81.1, 86.5, 124.11, 124.111, 280/124.128, 124.157
IPC ........................................................ B62D 61/12
See application file for complete search history.

(56) References Cited

U.S. PATENT DOCUMENTS

| | | | | |
|---|---|---|---|---|
| 3,191,961 A * | 6/1965 | Brennan et al. | | 280/81.1 |
| 3,912,293 A * | 10/1975 | Harbers | | 280/81.1 |
| 4,063,779 A * | 12/1977 | Martin et al. | | 298/22 P |
| 4,940,287 A * | 7/1990 | Ritchie | | 298/23 R |
| 5,403,031 A * | 4/1995 | Gottschalk et al. | | 280/86.5 |
| 5,407,251 A * | 4/1995 | Ritchie et al. | | 298/23 MD |
| 5,516,135 A * | 5/1996 | Christenson | | 280/405.1 |
| 5,540,454 A * | 7/1996 | VanDenberg et al. | | 280/81.1 |
| 5,713,424 A * | 2/1998 | Christenson | | 180/24.02 |
| 5,823,629 A * | 10/1998 | Smith et al. | | 298/23 R |
| 6,116,698 A * | 9/2000 | Smith et al. | | 298/23 R |
| 6,123,347 A * | 9/2000 | Christenson | | 280/86.5 |
| 6,189,901 B1 * | 2/2001 | Smith et al. | | 280/86.5 |
| 6,247,712 B1 * | 6/2001 | Smith et al. | | 280/86.5 |
| 6,247,713 B1 * | 6/2001 | Konop | | 280/86.5 |
| 7,281,721 B2 * | 10/2007 | Hudson et al. | | 280/86.5 |
| 7,731,208 B2 * | 6/2010 | Strong | | 280/86.5 |
| 7,740,252 B2 * | 6/2010 | Strong | | 280/86.5 |
| 7,775,308 B2 * | 8/2010 | Strong | | 180/24.02 |
| 7,775,533 B2 * | 8/2010 | Strong | | 280/86.5 |
| 7,841,604 B2 * | 11/2010 | Mitchell | | 280/86.5 |
| 2002/0020979 A1 * | 2/2002 | Smith et al. | | 280/86.5 |
| 2007/0090620 A1 * | 4/2007 | Lee | | 280/124.111 |

* cited by examiner

*Primary Examiner* — Joseph Rocca
*Assistant Examiner* — Laura Freedman
(74) *Attorney, Agent, or Firm* — Ronald L. Phillips

(57) ABSTRACT

A suspension system is disclosed that suspends a trailing axle with steerable wheels from the tailgate of a motor vehicle with the use of a carriage, a pair of actuators and gas springs. The carriage is pivotally connected to the tailgate, the axle is directly suspended from the carriage and the actuators are pivotally connected to the carriage and tailgate and adapted to establish the carriage and thereby the axle in a stowed condition on the tailgate and in an active condition where the axle trails the vehicle at a substantial distance and the actuators are connected to the tailgate so as to contribute in an enhanced manner to the roll stability of the vehicle.

20 Claims, 17 Drawing Sheets

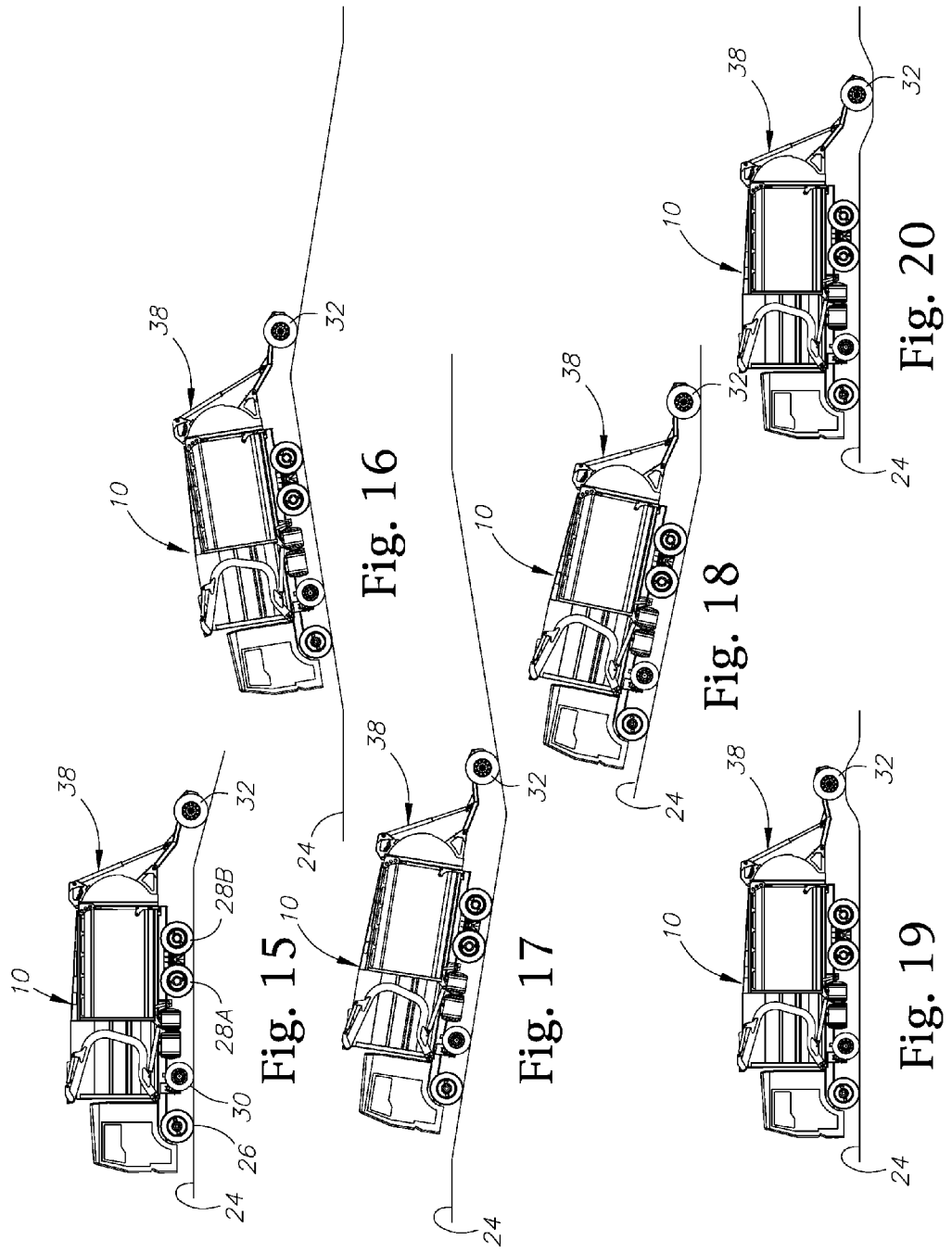

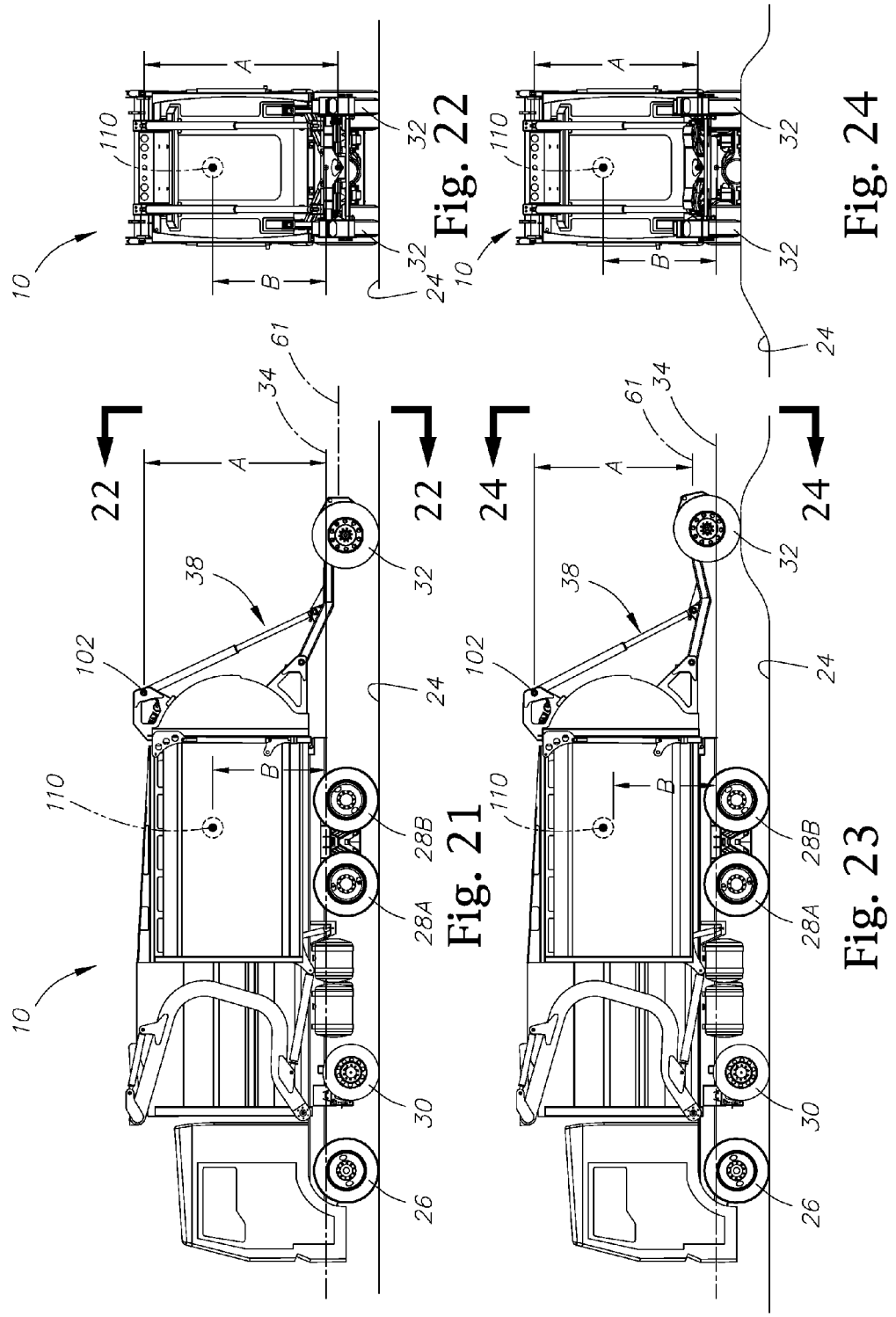

TRAILING AXLE SUSPENSION SYSTEM

TECHNICAL FIELD

This invention relates to trailing axle suspension systems for motor vehicles and more particularly to where the trailing axle has steerable wheels and is suspended from and stowed on the tailgate of the vehicle body.

BACKGROUND OF THE INVENTION

In employing a deployable trailing axle with steerable wheels to extend the load capacity of a motor vehicle by reducing the loads that the other axles support, conventional practice is mainly concerned with the load distribution between all the axles supporting the vehicle and accommodating differences in road grade between the trailing axle wheels and the wheels of the vehicle's primary axles that normally support the vehicle. As well as isolating shock forces on the steerable trailing axle wheels from the vehicle when the wheels encounter bumps and dips either conjointly or separately. While on the other hand, less concern is addressed to the extent to which a trailing axle suspension system can contribute to enhancing the roll stability of the vehicle. And this applies to a wide range of motor vehicles and especially payload-carrying motors such as refuse trucks, dump trucks, transit mixers and the like where a trailing axle can significantly extend the payload capacity while meeting road restrictions governing axle loading and the wheel base required of the vehicle in meeting bridge restrictions.

In addressing the matter of enhancing the vehicle roll stability with a trailing axle suspension for a payload-carrying vehicle, a major challenge is presented in providing such where the center of gravity of a load can vary significantly from a low elevation on the vehicle with little or no added load to a high elevation on the vehicle at the maximum allowable load weight. And as a result, centripetal forces resulting from the vehicle negotiating a curve at considerable speed and crosswind forces as well as unbalanced lateral forces acting on the vehicle can induce rolling/tilting of the vehicle frame to a varying degree that can be difficult to control. Especially when an added load is the maximum allowable with its center of gravity thus located at a high elevation relative to the vehicle frame's roll axis where it can have a large influence on vehicle roll resulting from centripetal forces and other forces acting to tilt or roll the vehicle frame about its roll axis. And this can include when the vehicle is encountering high crosswinds or executing a quick directional change even at a relatively low speed.

Moreover, it will be appreciated that a trailing axle in reducing the load on the drive axle(s) also reduces the roll stiffness of the drive axle suspension system despite the fact that there is actually a significantly heavier load with an accompanying higher center of gravity. With the trailing axle thus causing the drive axle suspension system to operate as though the load weighs significantly less than it actually is rather than increasing in roll stiffness to the degree that it otherwise could without being relieved of load to a certain degree by the trailing axle.

However, in attempting to maximize the degree to which a trailing axle suspension system can contribute to vehicle roll stability while allowing the axle to adjust to relatively large road grade differences between the trailing axle wheels and the wheels of the primary axles and blocking shock forces on the trailing axle wheels from the vehicle depends on whether the trailing axle is suspended from either the tailgate or the vehicle body or directly from the vehicle frame supporting the vehicle body. As they each present different challenges in attempting to arrive at a trailing axle suspension system that significantly contributes to vehicle roll stability without compromising other possible attributes of the trailing axle suspension system.

For example, it has been found that in the case of suspending a trailing axle with steerable wheels from a tailgate of a vehicle body that may not need to be tilted to discharge a load, there is the matter of then accommodating the axle in a suitable stowed condition without accompanying undesirable consequences. While significantly increasing the contribution of the trailing axle suspension to vehicle roll stability when the trailing axle is deployed and in also isolating shock forces on the trailing axle wheels from the tailgate. On the other hand, it has been found that in the case of suspending a trailing axle with steerable wheels from a vehicle body that is tilted to discharge a load, there is the matter of accommodating the trailing axle in a suitable stowed condition on the vehicle body and the operation of its tailgate while significantly increasing the contribution of the trailing axle suspension system to vehicle roll stability when the trailing axle is deployed and in also isolating shock forces on the trailing axle wheels from the vehicle body. And in the case of suspending the trailing axle directly from the vehicle frame and in seeking enhanced vehicle frame roll stability with the trailing axle, there is the matter of typically having to add further frame structure for suspending the trailing axle clear of the vehicle body to accommodate the operation of its tailgate and regardless of whether the vehicle frame that supports the vehicle body is tilted or not to discharge a load with the tailgate open. Moreover, suspending the trailing axle from the frame normally requires significantly more lateral (anti-roll) force derived from the trailing axle via the actuators to counter the roll inducing forces on the frame.

SUMMARY OF THE INVENTION

The present invention is directed to where a trailing axle with steerable wheels is entirely suspended from the tailgate. Wherein it was found that the vehicle roll stability can be significantly enhanced by the trailing axle suspension system in an effective manner while also providing for advantageous stowage of the axle on the tailgate, allowing large differences in road grade between the trailing axle wheels and those of the primary axles normally supporting the vehicle and all the while preventing shock forces on the trailing axle wheels from reaching the tailgate and thereby the vehicle body and vehicle frame. With these desired results provided by the present invention with a trailing axle suspension comprising a carriage from which the axle is directly suspended and a pair of actuators.

Wherein the carriage is pivotally mounted on the tailgate in a manner providing for the axle to be positioned in an advantageous stowed condition on the tailgate with the tailgate closed and in an active condition. With the trailing axle in the active condition located a substantial distance behind the vehicle where it is forced by the actuators to help support the vehicle with its wheels.

The actuators are pivotally connected at one end to the carriage and pivotally connected at an opposite end to the tailgate. With the actuators adapted to establish the trailing axle in the stowed condition and active condition with hydraulically forced action. And wherein gas springs are provided in a strategic manner to allow a wide range of movement of the trailing axle to accommodate differences in road grade between the trailing axle wheels and the wheels of the primary axles and prevent shock forces on the trailing axle wheels from being transmitted to the tailgate and thereby to the vehicle frame via the vehicle body. And wherein the actuators resist forced movement of the vehicle frame about its roll axis in an enhanced manner at the pivotal connections of the actuators with the tailgate and thereby contribute to the roll stability of the vehicle. With the latter being enabled to a significant degree in a force-strategic manner by the pivotal connections of the actuators with the tailgate being located so that the minimum possible distance in height between the trailing axle roll axis and the actuator pivotal connections with the tailgate is always greater than the maximum distance in height between the roll axis of the vehicle frame and the center of gravity of the maximum allowed load supported by the vehicle body. And thus provides for the trailing axle suspension system to counter roll inducing forces in a highly efficient manner.

These and other features and aspects of the invention will become more apparent from the accompanying drawings of an exemplary embodiment and the description thereof.

DESCRIPTION OF THE DRAWINGS

FIG. 15 is a reduced side view of the truck as shown in FIG. 4 with the truck remaining on a level portion of the road surface while the trailing axle wheels are then on an upwardly inclined portion of the road surface;

FIG. 16 is a view like FIG. 15 but with the trailing axle wheels then on an upwardly inclined portion of the road surface;

FIG. 17 is a view like FIG. 15 but with the truck on an upwardly inclined portion of the road surface and the trailing axle wheels on a downwardly inclined portion of the road surface;

FIG. 18 is a view like FIG. 15 but with the truck on an upwardly inclined portion of the road surface while the trailing axle wheels are on a level portion of the road surface;

FIG. 19 is a reduced side view of the truck as shown in FIG. 4 but with the trailing axle wheels encountering a bump in the road surface;

FIG. 20 is a view like FIG. 19 but with the trailing axle wheels encountering a dip in the road surface;

FIG. 21 is a side view like FIG. 4 with certain added height distances;

FIG. 22 is a view taken along the lines 22-22 in FIG. 21 when looking in the directions of the arrows, FIG. 23 is view like FIG. 21 but showing the trailing axle wheels encountering a bump;

FIG. 24 is a view taken along the lines 24-24 in FIG. 23 when looking in the direction of the arrows;

Figure 1:
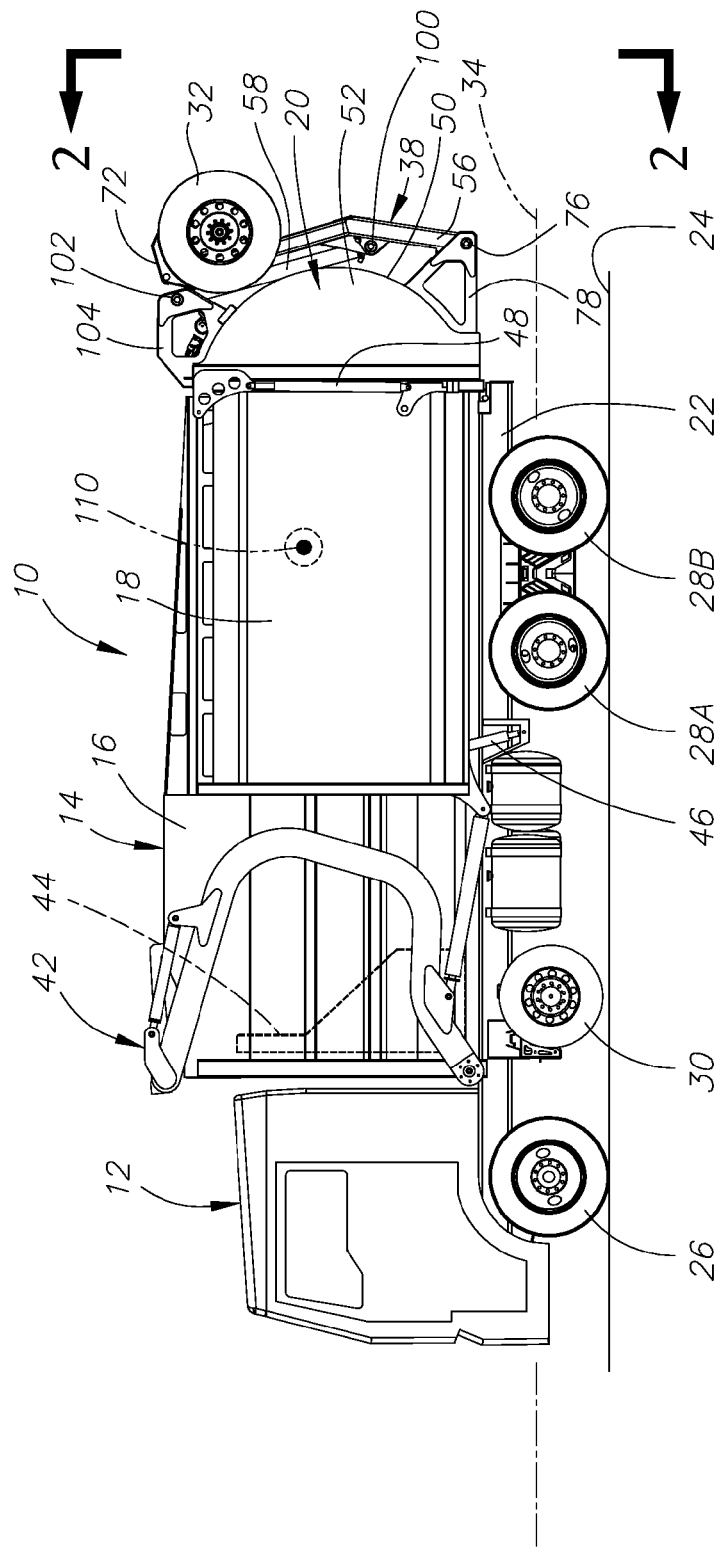
FIG. 1 is a side view of a front-loading refuse truck embodying the present invention wherein the trailing axle is shown in its stowed condition.

DESCRIPTION OF EXEMPLARY
EMBODIMENT

The present invention is disclosed as embodied in a payload-carrying motor vehicle in the form of a heavy-duty front-loading refuse truck 10 having a cab 12 that serves as a vehicle operator and passenger compartment and a truck body 14 that serves as payload container. Wherein the latter comprises a forwardly-located refuse receiving section 16 and an adjoining rearward-located refuse collecting section 18 having a tailgate 20 for discharging the refuse. With the cab 12 and the truck body 14 mounted on a frame 22 and the frame in turn normally supported on a road surface 24 by steerable front wheels 26 located under the cab 12 and driven tandem-arranged rear wheels 28A, 28B located under the refuse collecting section 18 which are associated with the primary axles of the vehicle. And to increase the load capacity of the truck, the truck has deployable auxiliary wheels 30 commonly referred to as pusher wheels that are located between the front wheels 26 and driven rear wheels 28A, 28B and under a forward portion of the refuse receiving section 16. And to further increase the truck's load capacity, the truck is provided with deployable auxiliary wheels 32 that on deployment operate at a significant distance rearward of the vehicle frame 22 and are commonly referred to as trailing wheels.

All of the wheels are of a convention type with pneumatic tires and have vehicle operator controlled service brakes of a suitable conventional type. And it will also be understood that the axles on which the front wheels 26, rear driven wheels 28A, 28B and pusher wheels 30 are mounted are suspended from laterally spaced locations on the vehicle frame 22 by conventional suspension systems. Wherein the front axle suspension system employs steel leaf springs and the drive axle suspension system has either steel leaf springs or rubber springs and in serving the primary axles of the truck establish a roll axis 34 about which the vehicle frame 22 and thus the cab 12 and truck body 14 can tilt/roll to a limited degree in a cushioned/sprung manner.

Figure 4:
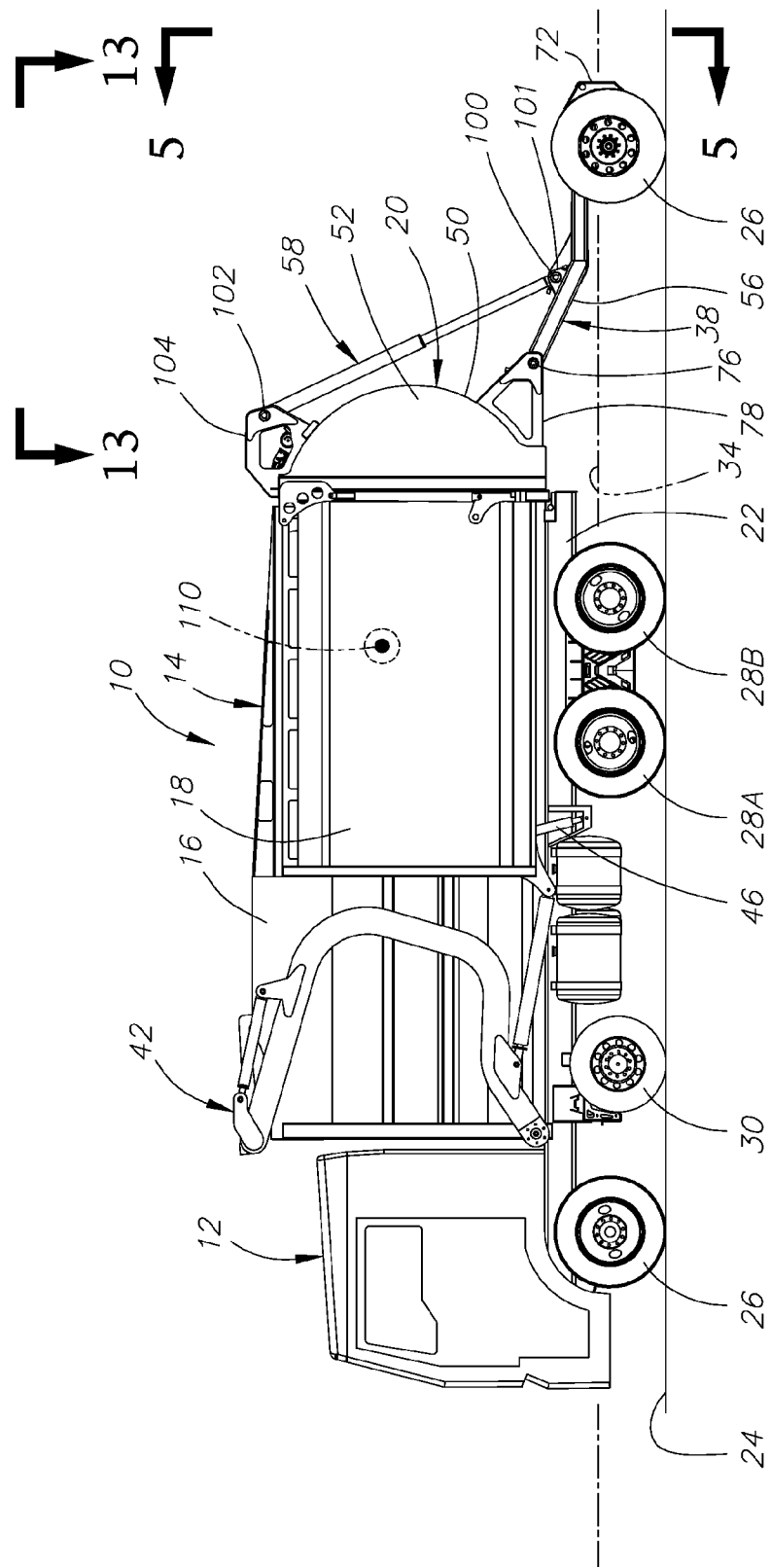
FIG. 4 is a view like FIG. 1 but showing the pusher axle wheels and the trailing axle wheels in their deployed active condition.

Whereas the pusher axle suspension system employs gas springs and the pusher wheels 30 are deployable on vehicle operator command from a stowed condition shown in FIG. 1 where they do not contact with a road surface to an active condition as shown in FIG. 4 where they are forced to contact with the road surface and thereby assist in supporting the vehicle frame to a certain degree and also in a cushioned/sprung manner. And whereas the trailing wheels 32 are also deployable on vehicle operator command to assist in supporting the vehicle frame and are mounted in a steerable manner on an axle 36 that is suspended entirely from the tailgate 20 by a trailing axle suspension system 38 according to the present invention.

Continuing on with the other truck components as well as the trailing axle suspension system 38, the collecting of refuse is provided by an opening in the top of the refuse receiving section 16 that is opened and closed by a roof panel 40 in a conventional manner under vehicle operator control. See FIG. 3. And for picking up refuse, the truck has a front-loading refuse container pickup system 42 of a conventional type under vehicle operator command. Wherein the pickup system 42 is adapted to pick up refuse collectors from in front of the truck and by lifting action over the cab 12 provide for depositing the collected refuse through the roof opening into the refuse receiving section 16.

Figure 8:
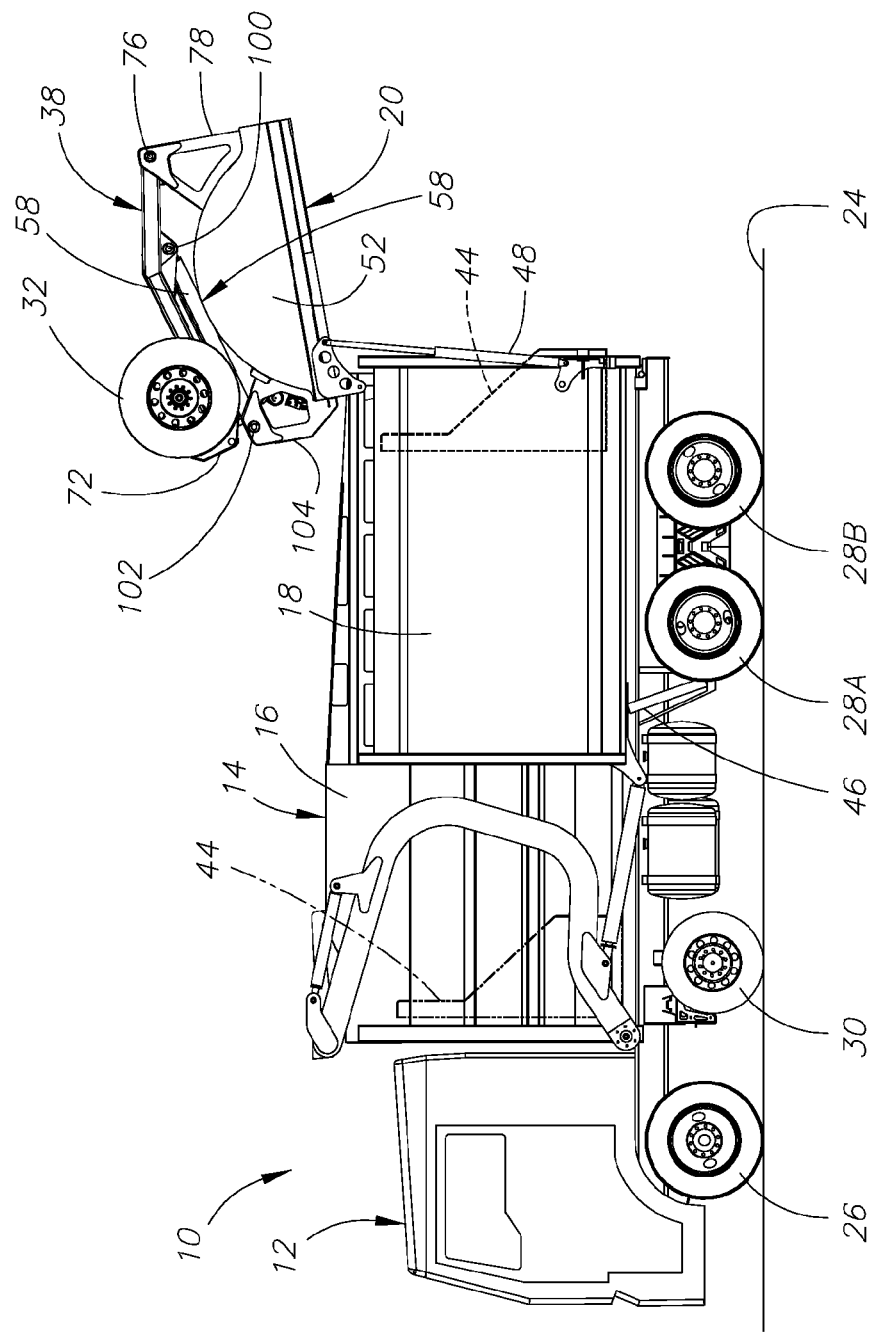
FIG. 8 is a view like FIG. 1 but showing the tailgate opened to discharge a load of refuse.
Figure 9:
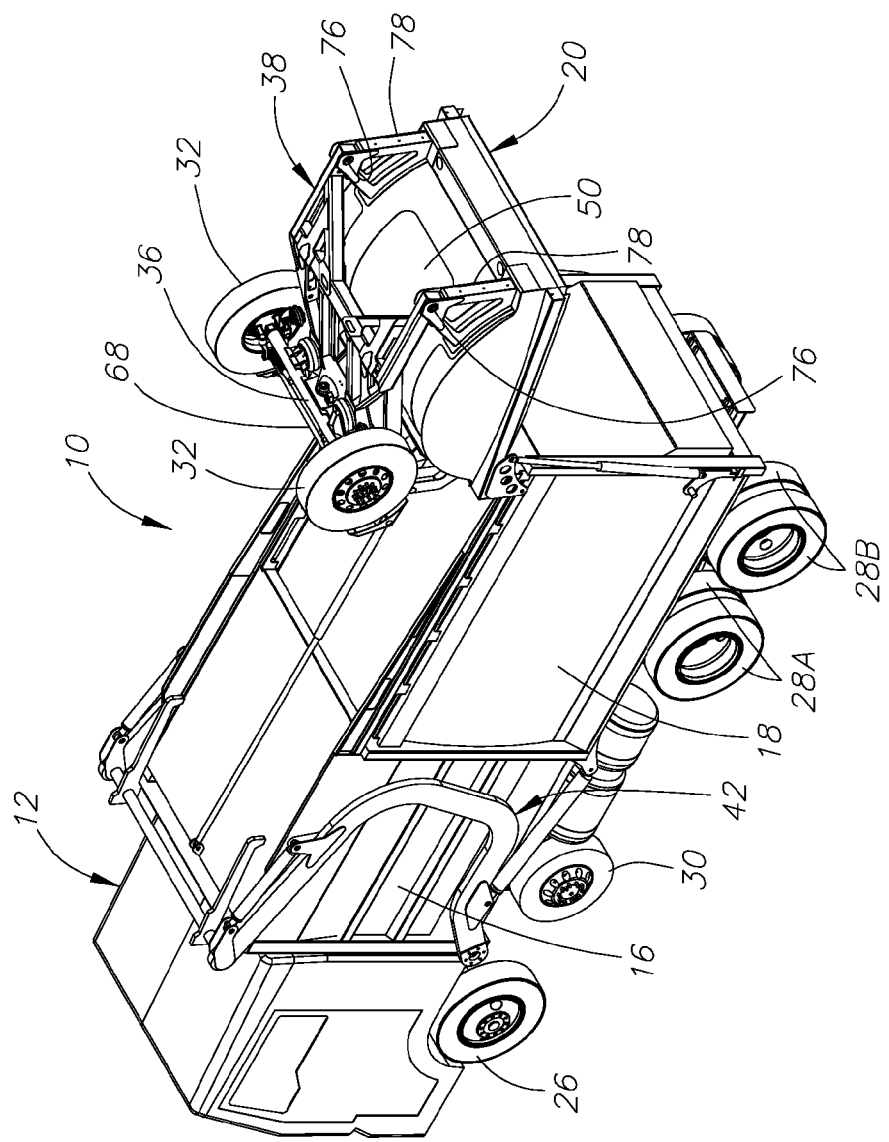
FIG. 9 is an isometric view of the truck as depicted in FIG. 8.

And with refuse thus deposited in the receiving section 16, the refuse is then managed in a conventional manner with a powered ram 44 mounted in the truck body. Wherein the ram 44 is shown in FIG. 1 in its fully retracted position when refuse is being received in the receiving section 16 and is shown in its fully extended position in FIG. 8 in pushing the refuse from the collecting station 18 onto a delivery site with the tailgate open. And wherein it will be understood that the ram 44 is operated in a conventional manner under operator command as refuse is received to force the refuse from the receiving section 16 into the collecting section 18 and with repeated refuse pick up operates to compact the refuse into a relatively dense mass in the collecting section that is located over the driven wheels 28A, 28B.

Figure 10:
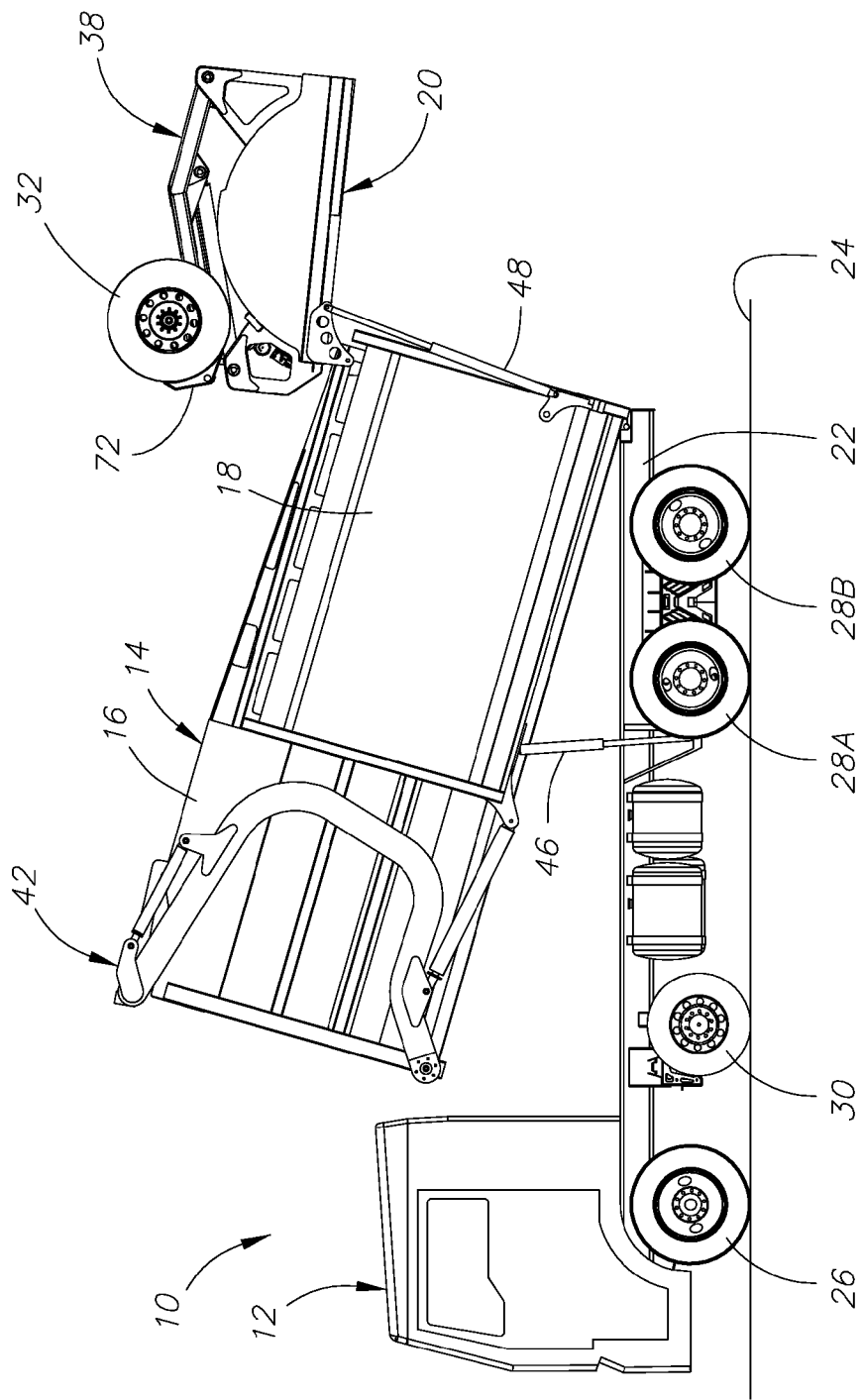
FIG. 10 is a view like FIG. 8 but showing the truck body/payload container tilted to discharge a load of refuse.
Figure 11:
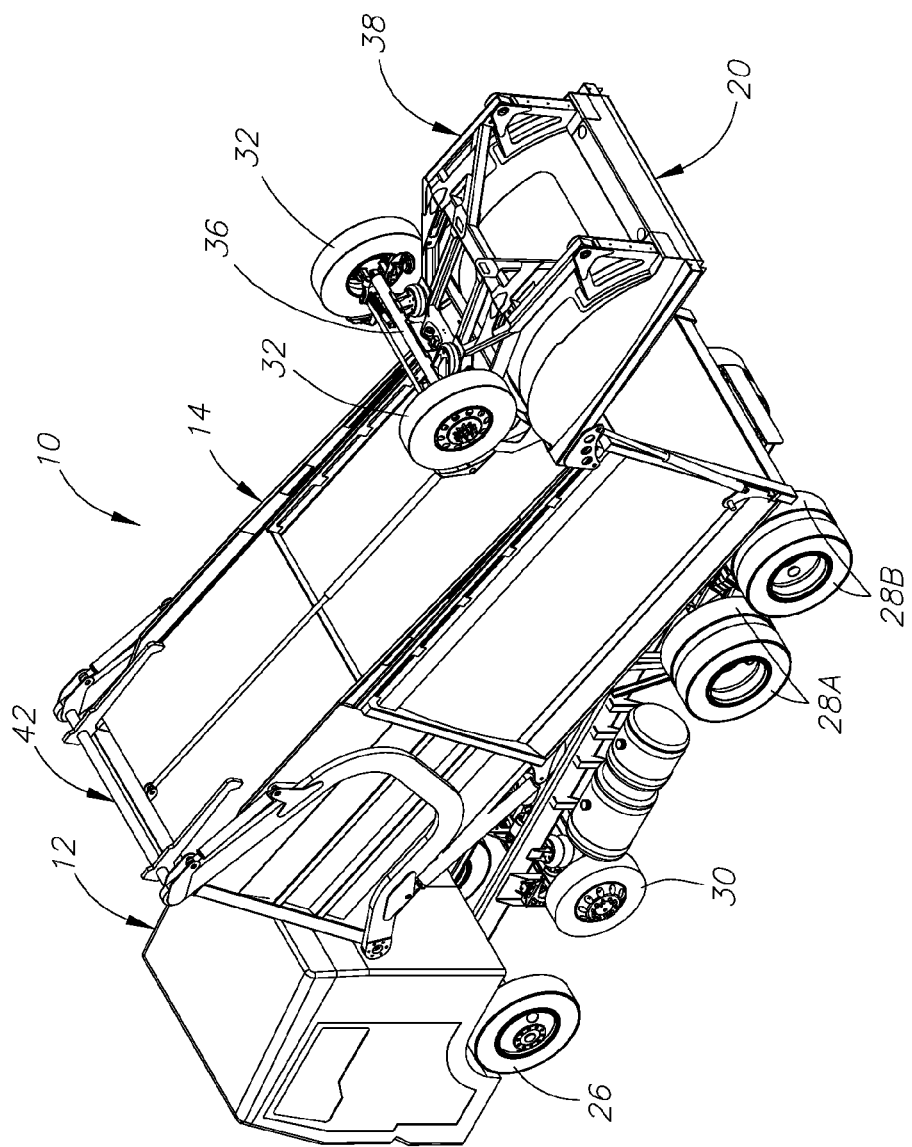
FIG. 11 is an isometric view of the truck as depicted in FIG. 10.
Figure 12:
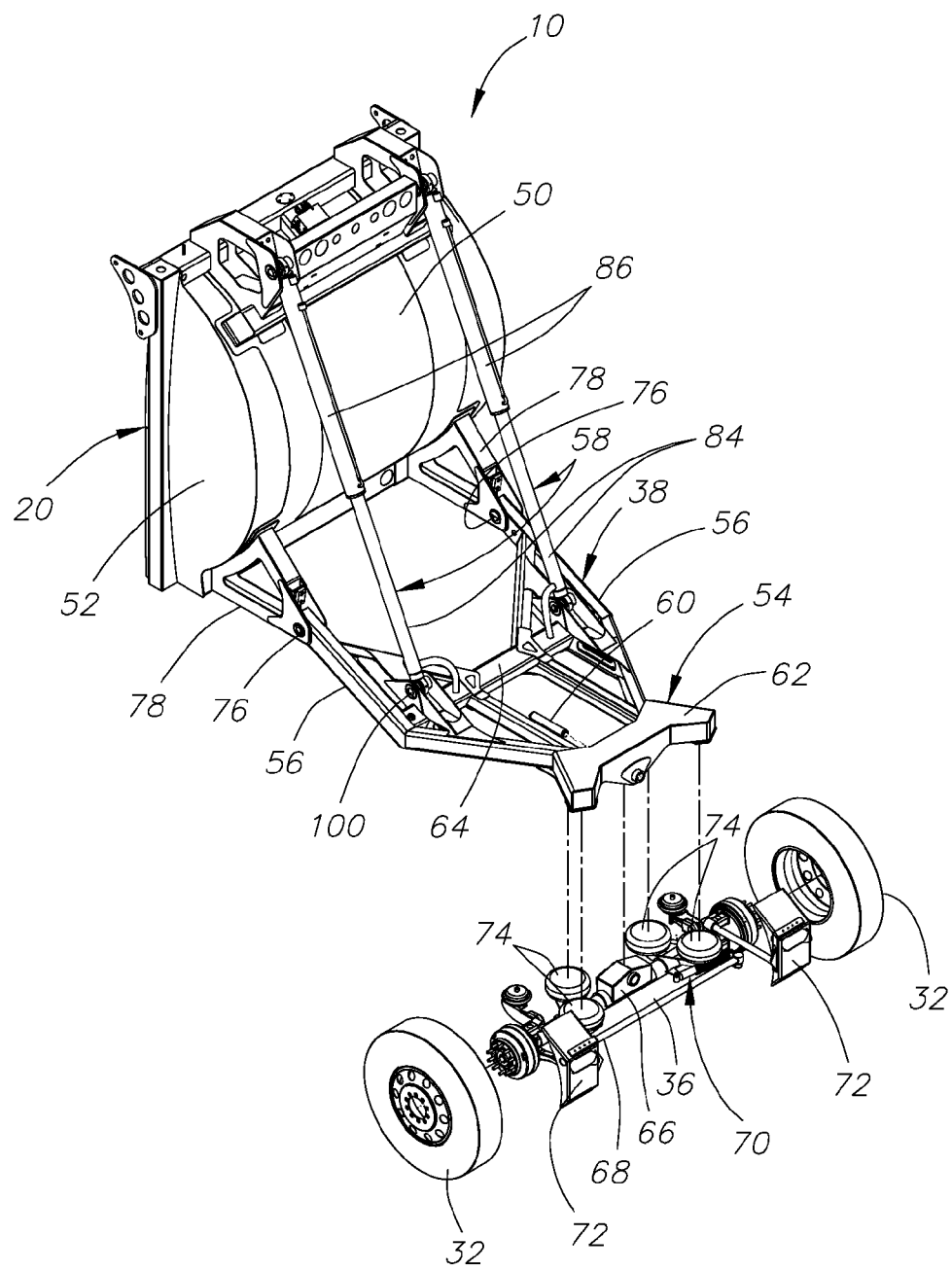
FIG. 12 is an exploded isometric view of the trailing axle assembly.

With the provision of the ram 44, it is not necessary to tilt the truck body for discharging a load from the truck. However, the truck body 14 is adapted to be tilted for maintenance and also possibly discharging a load without the operation of the ram 44. And this is provided by the truck body being hinged at its lower rear end to the vehicle frame 22 and tilting the truck body with a pair of vehicle operator controlled hydraulic cylinders 46. See FIG. 10 that shows only the near-side hydraulic cylinder 46. Whereby the truck body 14 is tilted from a nesting position on the vehicle frame 22 as shown in FIG. 1 to a suitable angled position as shown in FIG. 10.

Further describing the tailgate 20, it is hinged in a conventional manner at its upper end to the upper rear end of the refuse collecting section 18 and is swung between its closed position shown in FIGS. 1-7 and its open position shown in FIGS. 8-11 by a pair of hydraulic cylinders 48. Wherein the hydraulic cylinders 48 are located outboard of the truck body 14 at the rear end of the refuse collecting section 18, are operatively connected between the tailgate 20 and the truck body 14 in a conventional manner, and are under the control of the vehicle operator to open and close the tailgate. And wherein it will be understood that the tailgate 20 is held firmly closed at its lower end by a suitable latching mechanism of a conventional type that retains the tailgate in its closed condition on full closure and is released by the vehicle operator to allow opening.

In addition to providing opening and closure of the truck body 14, the tailgate 20 also provides increased refuse collecting capacity in having a rearward-projecting convex side 50 and opposite-facing side walls 52 which cooperatively form an extension of the refuse collecting section 18 with the tailgate closed and latched that projects a substantial distance beyond the rear end of the vehicle frame 22. Whereby the tailgate 20 significantly adds to the capacity of the collecting station 18 beyond the rearward extent of the truck frame but presents an obstacle to providing for efficient stowage of a trailing axle suspended from the tailgate. And even without such projection, the tailgate presents challenges in utilizing a tailgate suspended trailing axle to best advantage with regard to allowing significant trailing axle travel in accommodating road grade changes at its wheels, isolating shock forces on its wheels from the vehicle frame and thus the cab and truck body, and adding significantly to the vehicle's roll stability. Wherein the vehicle frame and thus the cab and truck body can roll and pitch with respect to the roll axis 34 in cushioned manner as permitted by the front axle and driven axle suspension systems and can also yaw but to a very limited extent such as with a severe change in vehicle direction.

In adding to the payload capacity and the wheelbase of the refuse truck with the trailing axle 36 as well as substantially enhancing the roll stability of the truck, the trailing axle suspension system 38 accomplishes this in an operationally strategic manner. Wherein a carriage 54 is provided from which the trailing axle 36 is directly suspended and the carriage has a pair of rigidly joined suspension arms 56 and together with a pair of actuators 58 suspend the trailing axle carriage and thereby the trailing axle directly from the tailgate 20 and thereby from the vehicle frame 22 via the truck body 14.

Figure 13:
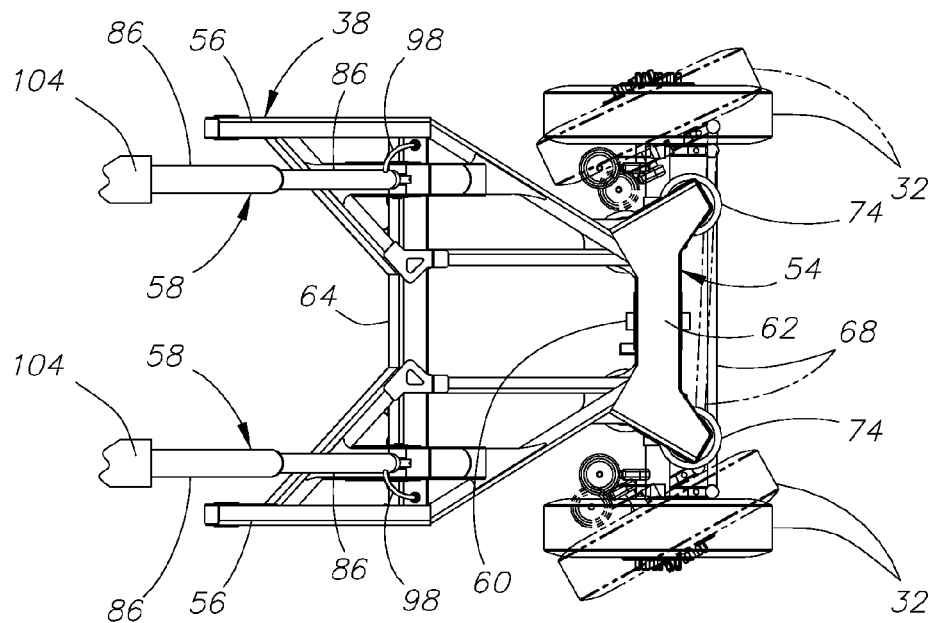
FIG. 13 is an enlarged view taken along the lines 13-13 in FIG. 4 when looking in the direction of the arrows and with the trailing axle's steerable wheels shown in solid lines in their normal neutral position and shown in phantom lines at one of their maximum steering angles and with the wheel fenders omitted.
Figure 14:
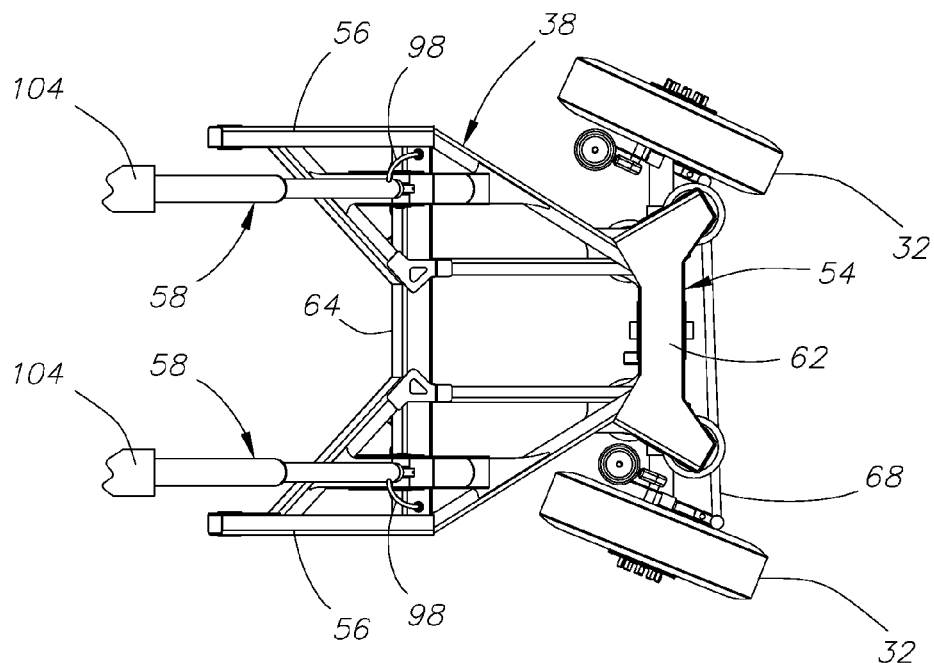
FIG. 14 is a view like FIG. 13 but showing the trailing axle's steerable wheels at their other maximum steering angle.

The trailing axle 36 is pivotally mounted on the carriage 54 at a central location on the axle offset from the axle center-line by a pivot pin 60 that sets the roll axis 61 of the axle (see FIGS. 19-22) and is received by a laterally extending contoured crossmember 62 that forms the body of the carriage. Wherein the crossmember 62 is rigidly joined at laterally spaced locations to the carriage suspension arms 56 and is trussed with a crossbeam 64 that is rigidly joined at its opposite ends with the suspension arms 56 at an intermediate location along their length where the arms angle laterally inward for their joinder with the body 62 of the carriage and allow the trailing axle wheels 32 to steer to a significant degree. See FIGS. 13 and 14. With the carriage body 62 also providing for the mounting of springs that directly act on the axle as described later as well as serving to pivotally support the axle 36. Wherein the carriage body 62 in providing such axle support receives at its underside a boxed center portion 66 of the trailing axle assembly in a sandwiching manner where after the pivot pin 60 is inserted though both to complete the pivotal connection of the trailing axle with the carriage. See FIGS. 5-7 and 12.

The trailing axle wheels 32 are steered by the directional movement of the truck and for this operation are mounted in a conventional manner on the ends of the trailing axle 36 with spindles that provide a suitable camber and caster angle and have their steering arms connected by an adjustable tie rod 68 that sets the desired toe-in for the wheels. And in providing for such steering action, the trailing axle wheels 32 are stabilized and returned following their forced steerage to a normal neutral condition (zero steer angle) by their caster angle and coil spring and shock absorber assemblies 70 that are connected between the spindle steering arms and the carriage 54. See FIGS. 2, 7 and 12. And with the trailing axle wheels being steerable, fenders 72 are provided that are mounted on the trailing axle wheel spindles so as to trail behind and thus turn conjointly with the respective wheels when the trailing axle is active. For example, see FIG. 13 that shows the trailing axle wheels 32 at one maximum steering angle in solid lines and at zero steer angle in phantom lines and FIG. 14 that shows the wheels at their opposite maximum steering angle.

With the trailing axle 36 pivotally mounted on the carriage 54 with the pivot pin 60, tilting movement of the axle relative to the carriage and about the trailing axle roll axis 61 is resisted by four gas springs 74 of elastomeric bag construction located in pairs on opposite sides of the trailing axle pivot pin 60 and mounted between the trailing axle and the carriage. See FIG. 12. And unlike the pusher wheel suspension system, the carriage gas springs 74 are continuously filled with air at a suitable pressure that can be increased or decreased by the vehicle operator according to the loading on the trailing axle and to the degree to which they are desired to contribute to vehicle roll stability as further described later.

Figure 2:
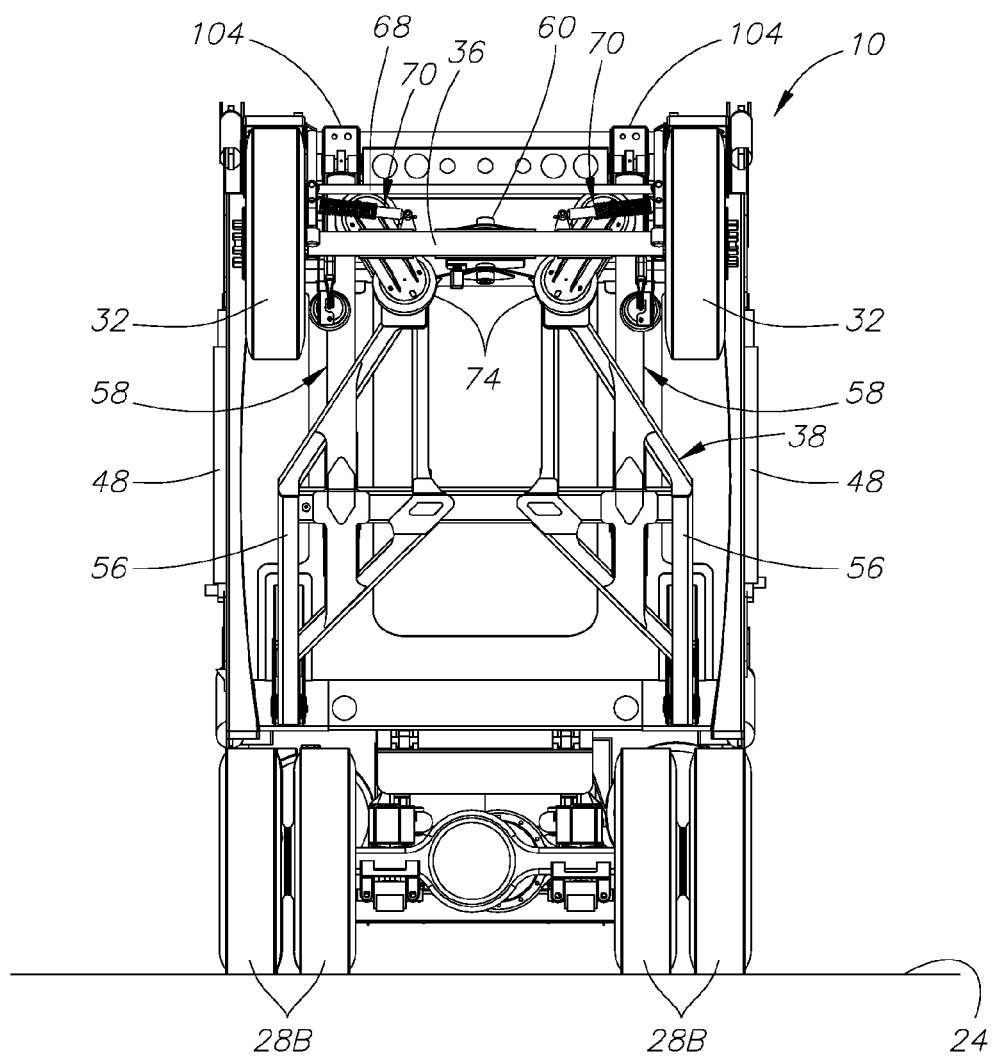
FIG. 2 is an enlarged view taken along the lines 2-2 in FIG. 1 when looking in the direction of the arrows.
Figure 3:
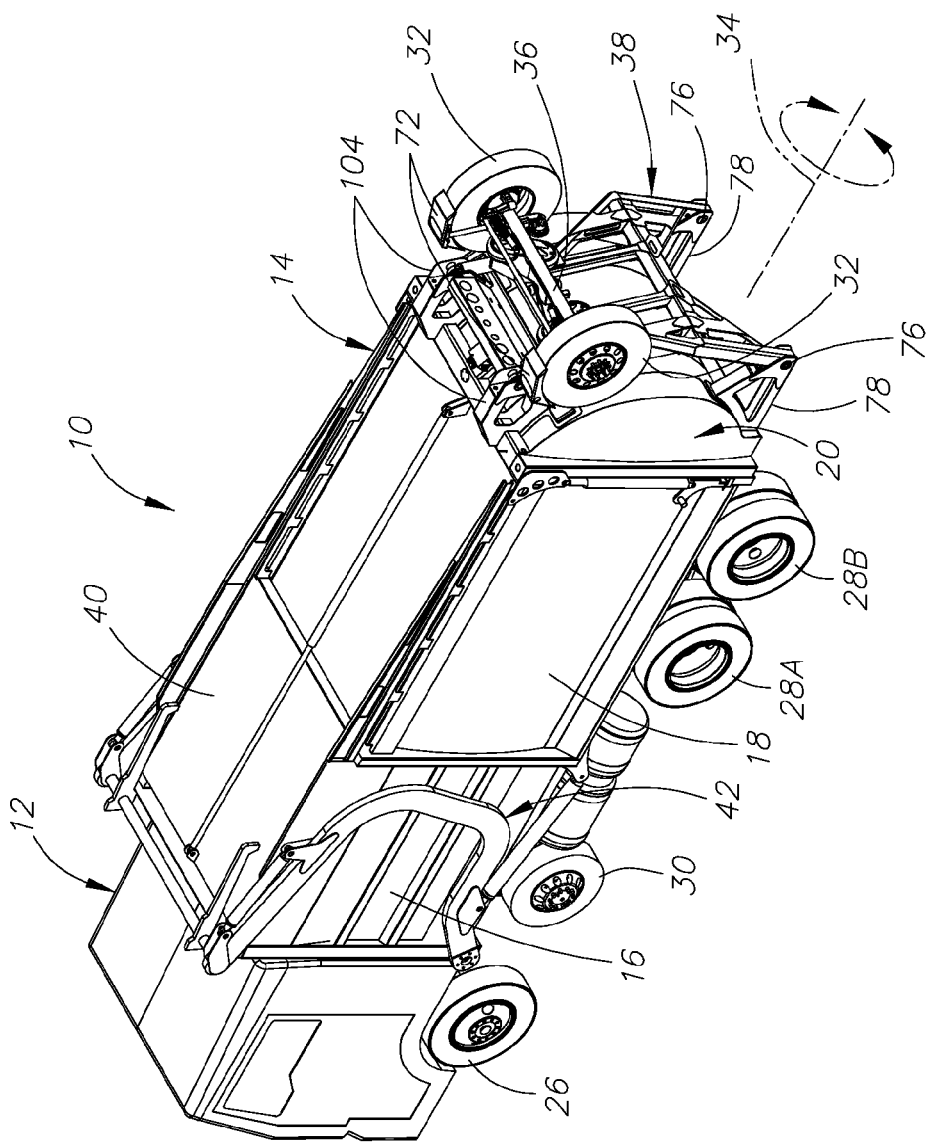
FIG. 3 is an isometric view of the truck depicted in FIG. 1.
Figure 5:
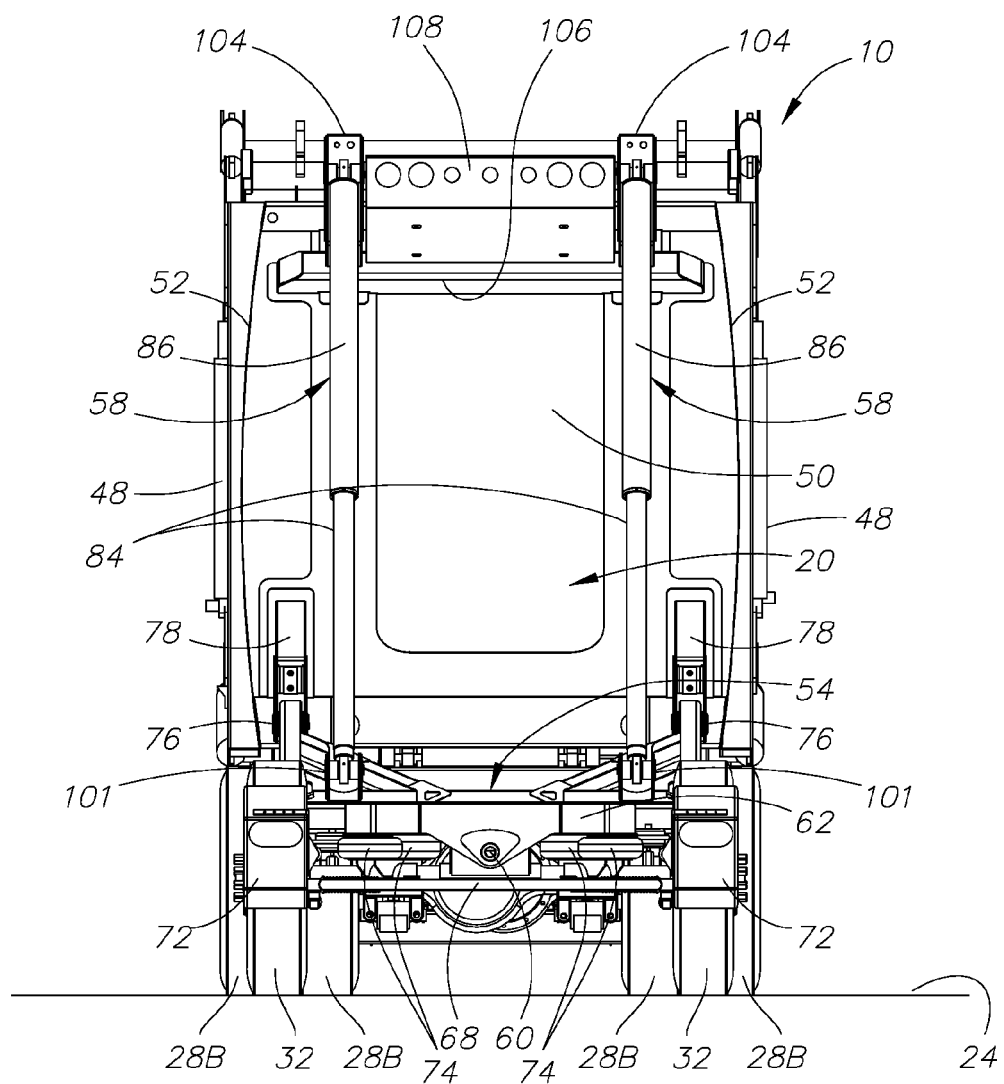
FIG. 5 is an enlarged view taken along the lines 5-5 in FIG. 4 when looking in the direction of the arrows.
Figure 6:
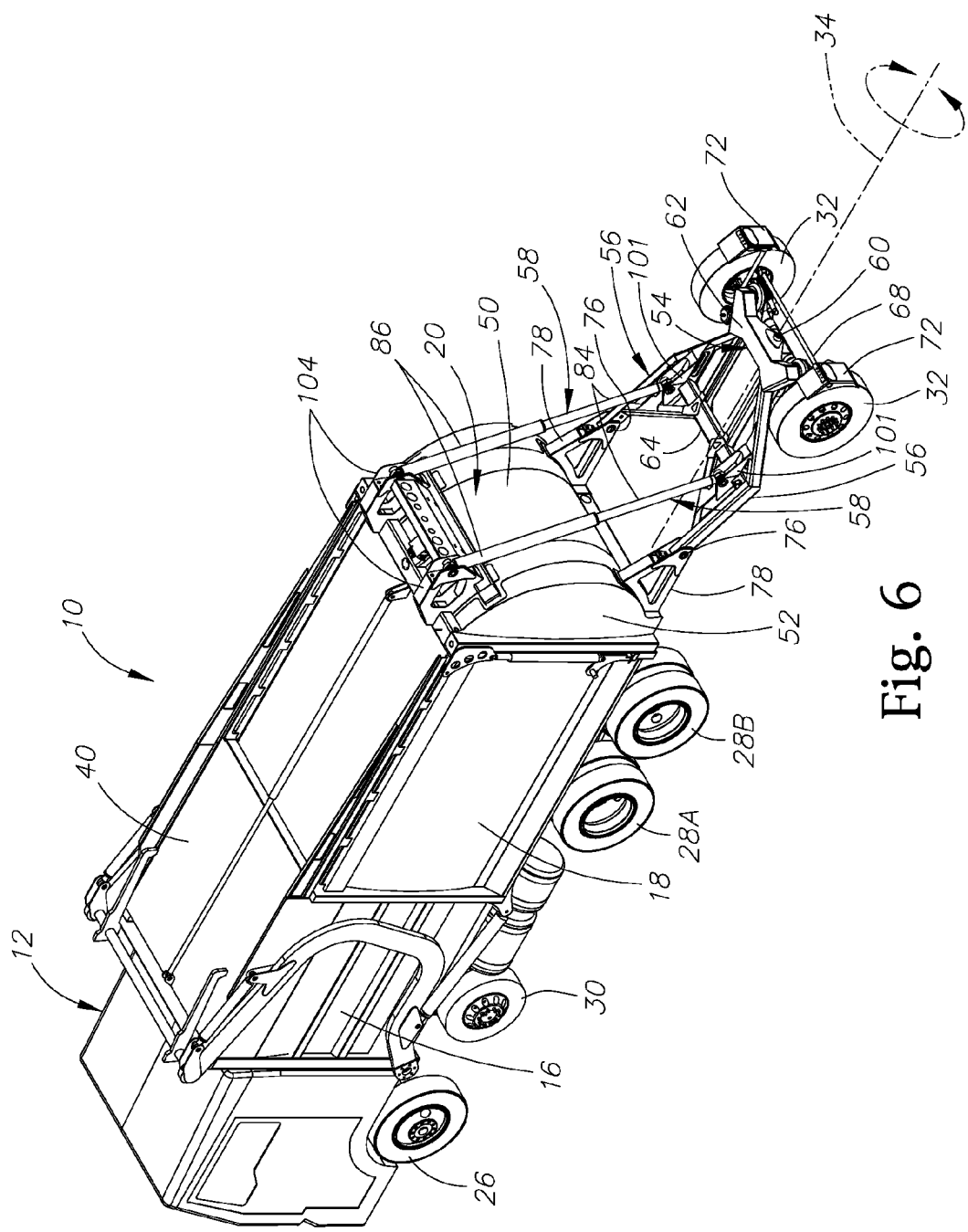
FIG. 6 is an isometric view of the truck as depicted in FIG. 4.
Figure 7:
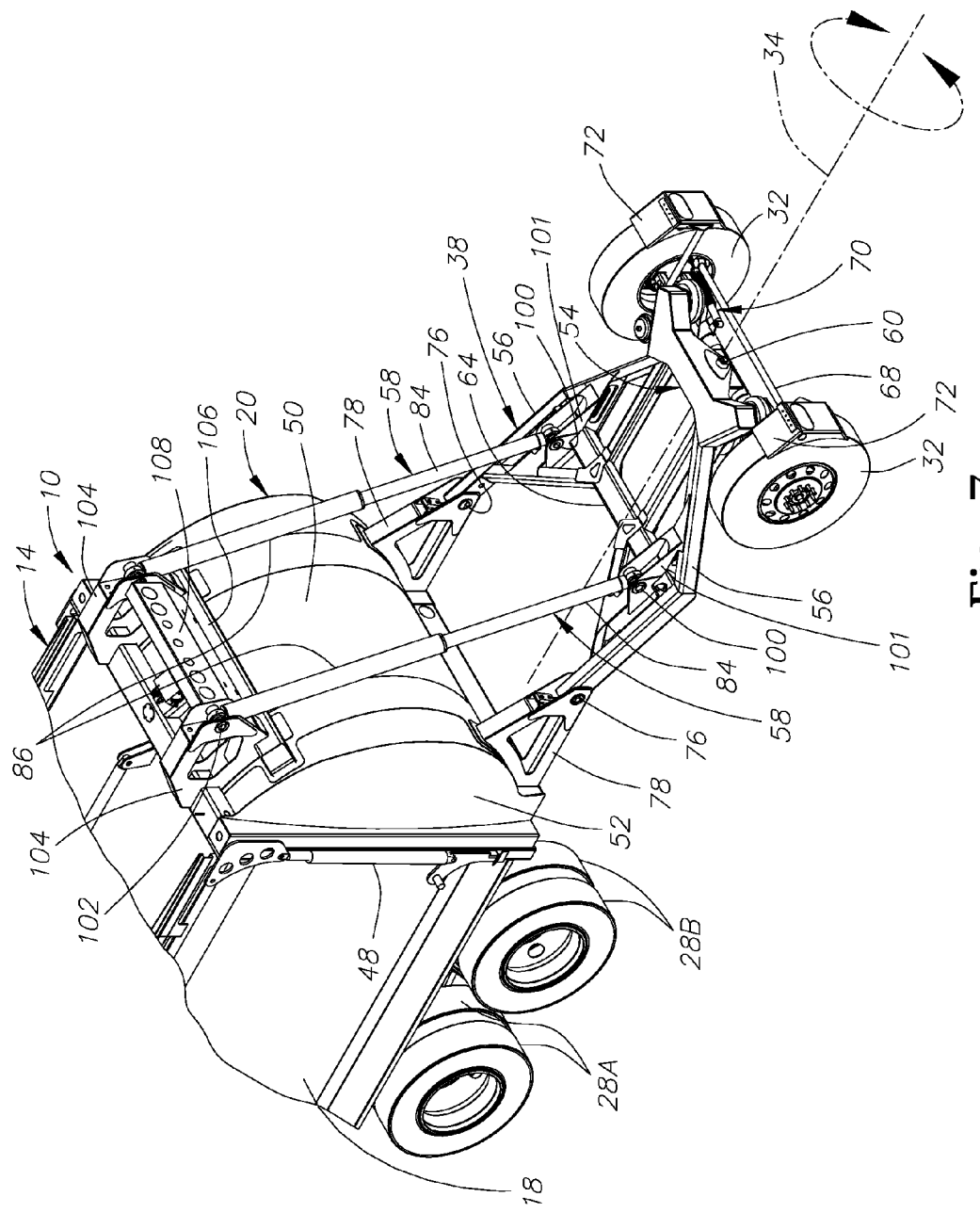
FIG. 7 is an enlarged isometric view of the trailing axle suspension system in its deployed active condition.

Further describing the trailing axle suspension system 38, the suspension arms 56 form rigid integral portions of the carriage 54 and extend parallel to each other between the crossbeam 64 and the tailgate 20 after angling inward to join with the carriage crossmember 62 and are pivotally connected at their distal end to the tailgate 20 with pivot pins 76 and anchoring brackets 78. Wherein the anchoring brackets 78 are of trussed construction, are rigidly joined at their base to bottom corner portions of the tailgate 20 and extend a substantial distance outward thereof and beyond the extent of the convex tailgate side 50 in receiving the pivot pins 76. Whereby the suspension arms 56 with their pivotal connection to the tailgate 20 are firmly pivotally connected with the vehicle frame 22 when the tailgate is closed and latched. And the carriage 54 and thus the trailing axle 36 is thereby adapted to pivot between a stowed condition on the tailgate 52 as shown in FIGS. 1-3 and an active condition as shown in FIGS. 4-6. With the carriage 54 and trailing axle 36 in the stowed condition with the tailgate closed and latched located at their maximum vertical extent and directly above the pivotal connections of the suspension arms when the actuators 58 are fully retracted. And with the fenders 72 then at but not extending above the highest extent allowed of the truck in meeting vehicle height restriction requirements. That for example in many states limit the vehicle height to 13 feet-4 inches and with the fenders 72 in the exemplary embodiment then being just below this maximum height.

On the other hand, the trailing axle 36 when in the active condition with the tailgate closed and latched is located at a substantial distance behind the vehicle with its wheels 32 then contacting with a road surface and the trailing axle being downwardly forced by the actuators 58 as further described later to help support the truck as well as extend its effective wheel base. For example, the trailing axle 36 in the exemplary embodiment is then located at about 13 feet-9 inches behind the center of the rear most driven wheels 28B and thereby significantly adds to the effective wheel base of the truck in meeting bridge restrictions.

Figure 25:
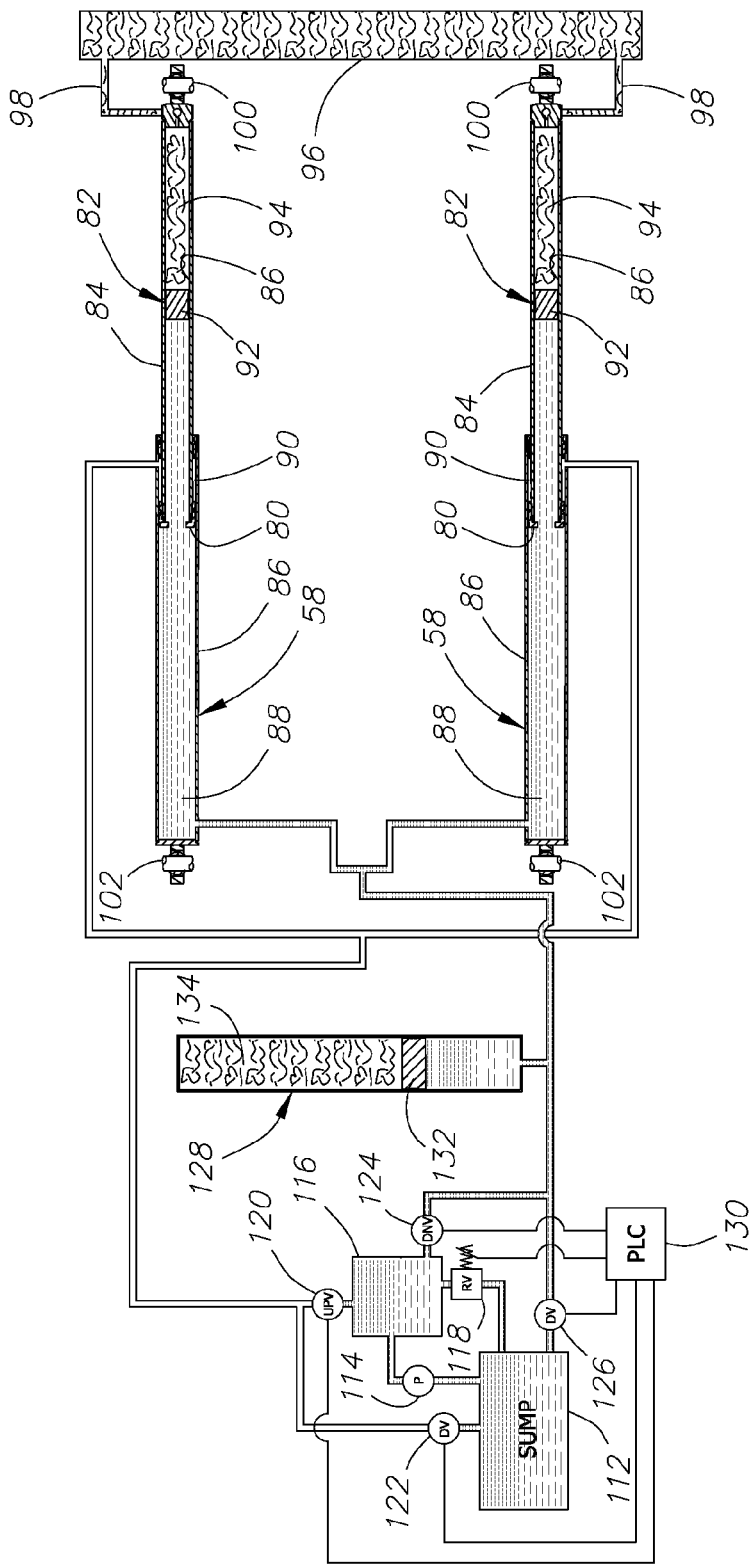
FIG. 25 is a schematic of the components associated with the operation of the actuators in the trailing axle suspension system.

Further describing the actuators 58 and with reference to FIG. 25, they comprise a hydraulically operated piston 80 of cylindrical annular shape and a hydraulically associated gas spring 82. Wherein their piston 80 has an integral piston rod 84, is received in a cylinder 86, and is operated by supplying hydraulic pressure to and exhausting hydraulic fluid from hydraulic chambers 88 and 90 at opposite ends of the piston. And wherein their gas spring 82 comprises a cylindrical piston 92 that is received in a cylinder formed by the piston rod 84, is exposed at one end to hydraulic pressure acting in the chamber 88 through the central opening in the piston 80, and is exposed at the opposite end that is of equal area to a gas chamber 94. To which a suitable gas under pressure is made available by an elongated cylindrical tank 96 that serves as a gas pressure accumulator, is mounted in the crossbeam 64, and is connected at opposite ends by flexible hoses 98 to the gas chamber 94 in the actuators. See FIGS. 12-14 and 25. And wherein the gas circuit of the actuators comprising their gas chamber 94 and the gas pressure accumulator 96 is charged in a static condition with a gas such as nitrogen that is free of water vapor and at a suitable pressure to support the actuator gas spring operation later described with the trailing axle 36 in its active load bearing condition.

Describing now the mounting of the actuators 58, they are arranged in parallel laterally-spaced relationship and are pivotally connected at their opposite ends to the suspensions arms 56 and tailgate 20. With the actuators 58 pivotally connected at one end (the projecting end of their piston rod 84) by pivot pins 100 and anchoring brackets 101 to the inwardly-angled portion of the respective suspension arms 56 adjacent the crossbeam 64 and thus at a location intermediate the ends of the arms. And with the actuators 58 pivotally connected at their opposite end (the closed end of their cylinder 86) to the tailgate 20 by pivot pins 102 and anchoring brackets 104 of trussed construction. Wherein the brackets 104 are rigidly joined at their base to corner portions of the tailgate 20 adjacent its upper end where it is reinforced by a crossmember 106 to accommodate the resulting forces acting on the tailgate. And wherein the brackets 104 do not extend above the highest extent of the truck body 14 and the refuse pickup system 42 with the tailgate closed but do extend a substantial distance outward of the tailgate and above but not beyond the tailgate's projecting convex side 50 to provide for the outward location of the actuator pivot pins 102 with respect to the tailgate. And wherein there is provided a rectangular box 108 that is mounted on the crossmember 106 between the brackets 104 and has suitable lights that at this high elevation on the tailgate are readily visible from behind the truck when the trailing axle is deployed.

The actuators 58 are thus arranged to extend over the tailgate side 50 with their pivotal connection to the tailgate 20 and are firmly pivotally connected with the truck frame 22 when the tailgate is closed and latched and at laterally aligned locations that are (a) forward of the pivotal connection of the carriage 54 with the suspension arms 56 without extending above the highest extent of the truck body 14 and the refuse pickup system 42, and (b) above the highest possible elevation of the center of gravity of the maximum allowable load which is indicated as occurring at approximately the location 110 in the exemplary embodiment. Where such center of gravity is situated between the axles of the drive wheels 28A, 28B and at a substantial distance above the center height of the truck body 14. And with the actuators 58 thus connected with the tailgate and thereby with the vehicle frame 22 via the truck body 14 to apply optimum resistance by the trailing axle suspension system 38 as further described later against forces tending to tilt the vehicle frame about its roll axis 34 that is determined by the setup of the front axle and driven axle suspension systems as earlier mentioned and will vary to some extent from that shown depending on the load.

Describing now the overall arrangement of the trailing axle suspension 38, the suspension arm pivot pins 76 are axially aligned as are the actuator pivot pins 100 and 102 with centerlines parallel to the axles of the front wheels 26, driven wheels 28A, 28B and pusher wheels 30 as established by their suspension systems. Whereby the carriage 54 and thereby the trailing axle 36 is supported in parallel relationship with the other axles supporting the vehicle frame and with the pivot axis/roll axis 61 of the trailing axle in substantially parallel relationship with the vehicle frame's roll axis 34 when the truck is operating on a level road surface. See FIGS. 21 and 22. Wherein the trailing axle 36 is thus supported for pivotal or tilting movement of the trailing axle in a plane at substantially right angles to the truck frame's roll axis when the trailing axle is in its active condition with the trailing axle and the primary axles of the truck on a level grade and in a plane that remains at right angles to the trailing axle pivot axis 61 that can intersect with the roll axis 34 in a common plane when the trailing axle experiences changes in road grade relative to the vehicle frame. See FIGS. 23 and 24. And the gas springs 74 that operate directly on the centrally pivoted trailing axle 36 with their spring action thus accept and accommodate only the lateral loads or forces acting to tilt the truck frame 22 about its roll axis 34 and thus assist the other axle suspension systems in resisting tilting vehicle frame motion in a cushioning manner to a degree that depending on the vehicle loading can be adjusted by the vehicle operator to provide for more tilting resistance by the trailing axle independent of the other axles by simply increasing the air pressure in the gas springs 74.

The direct acting trailing axle gas springs 74 that will also be referred to herein as carriage gas springs have significantly less compliance than that of the pusher axle gas springs and like the latter are arranged at their factory recommended mean road height that is desired for normal spring life. Wherein the carriage gas springs 74 have a compressible volume significantly smaller than that of the pusher axle gas springs and also a static pressure that can be less. And as a result, the carriage gas springs 74 incur a significantly higher pressure increase in compression than that available from the pusher axle gas springs and in their forcibly resisting tilting of the vehicle frame about its roll axis 34 via the actuators 58. That contributes to a significant degree in comparison with that available from the suspension systems of the primary axles and particularly that of the drive axles when they have been relieved of load to a considerable extent by the trailing axle but with an accompanying decrease in the ability to resist tilting of the frame about its roll axis.

Moreover, the carriage gas springs 74 have the ability because of their close proximity to the trailing axle pivot pin 60 to allow proportionally greater trailing axle wheel amplitudes but not nearly to the extent of that allowed of the pusher axle wheels by their gas springs. And with the pivotal trailing axle 36 and carriage gas springs 74 thus contributing to a significant and vehicle operator adjustable degree in supporting lateral loading on the truck frame while having the cushioning ability to also efficiently accommodate bumps and depressions in a road surface encountered by either or both of the trailing axle wheels 32 to a satisfactory degree while also preventing transmittal of shock forces on the trailing axle wheels to the truck from occurrences such as when one or both of the trailing axle wheels encounter an abrupt bump or dip in the road surface.

Moreover, the actuators 58 in deploying the trailing axle 36 in its active condition and by virtue of their gas spring 82 also allow the trailing axle 36 to extend a significant distance both below road grade relative to the vehicle frame 22 as shown in FIGS. 15 and 16 and above grade as shown in FIGS. 17 and 18. For example, the actuators 58 in the exemplary embodiment allow the trailing axle to travel about 20 inches both above and below road grade. And with such trailing axle travel occurring in a cushioned manner when the trailing axle wheels 32 encounter bumps and dips in a road surface as shown in FIGS. 19 and 20, respectively.

In considering the enhanced vehicle roll stability provided by the present invention, it is helpful to understand that the front axle and driven axle suspension systems are adapted in a conventional manner to normally support the vehicle frame 22 at the front wheels 26 and drive wheels 28A, 28B in a ride-height relationship that is substantially parallel to a flat road surface as shown in FIG. 1 with and without a payload. Wherein the roll axis 34 remains generally in the position shown and with respect to which the vehicle frame 22 and thus the cab 12 and truck body 14 can as earlier mentioned pitch and roll under control to a limited degree and also possibly yaw but to a very limited degree such as when the truck is traveling at a high speed on a curved road. While on the other hand, the trailing axle suspension system 38 is not so limited in ability with regard to resisting tilting of the vehicle frame about its roll axis and its contribution to enhancing vehicle roll stability results from the strategic connection of the actuators 58 with the tailgate at such an elevated location as compared to the other axle suspension systems that are suspended from the vehicle frame at relatively low locations and especially in respect to that of the drive axles whose ability to resist vehicle frame roll is diminished because of the reduction in the load acting thereon that results from the load relieving action provided by the trailing axle.

Describing now the components associated with the operation of the trailing axle suspension system 38 and with reference to FIG. 25, they comprise a vented hydraulic reservoir/sump 112, a hydraulic pump (P) 114, a hydraulic pressure supply manifold 116, a controllable hydraulic pressure regulator valve (RV) 118, an Up Valve (UPV) 120 and associated Dump Valve (DV) 122, a Down Valve (DNV) 124 and associated Dump Valve (DV) 126, an optional gas spring 128, and a Programmable Logic Controller (PLC) 130. Wherein these components are operatively connected as shown and with the trailing axle suspension system actuators 58. And it will be understood that the PLC 130 is programmed to operate under the command of the vehicle operator in controlling the operation of the trailing axle suspension 38 as will now be described.

The trailing axle suspension actuators 58 as depicted in FIG. 25 have been conditioned to establish the trailing axle 36 in its active condition to assist in supporting the truck. And in accomplishing this, the PLC 130 in response to a command by the vehicle operator has opened the Down Valve 124 and closed the associated Dump Valve 126, closed the Up Valve 120 and opened the associated Dump Valve 122 and while the pump 114 operates continuously in supplying hydraulic fluid under pressure from the sump 112 to the manifold 116 as well as other hydraulically operated components on the truck.

At the manifold 116, the pressure of the hydraulic fluid is regulated by the regulator valve 118 that exhausts excess fluid back to the sump beyond that required to maintain the hydraulic pressure at a desired operating pressure that is determined by the PLC 130 according to the down force prescribed for the trailing axle 36 in assisting to help support the vehicle. And this may for example include an automated process that by controlling the down force on the trailing axle, the trailing axle is utilized to control the loading on all the axles to best advantage in supporting the truck according to its existing weight and which can change with the adding and discharging of a load. And whether this pressure is set for two different operating pressures (a relatively low pressure for little or no added load and a relatively high pressure to accommodate greater loads up to the maximum) or automatically controlled to vary in some manner over a wide range of operating pressure, the actuators 58 as depicted in FIG. 25 have resultantly extended to deploy and establish the trailing axle 36 in its active condition as shown in FIGS. 4-7 to help support the truck. With this accomplished by the hydraulic pressure then being supplied to the actuator hydraulic chambers 88 while their other hydraulic chambers 90 are exhausted to the sump to thereby deploy and establish the trailing axle in the active condition where it is forced down ward by the hydraulic pressure on the actuator pistons 80 to the desired degree to help support the vehicle frame as well as extend the effective wheel base of the truck.

The actuator gas springs 82 because of the axial extent of the actuators 58 in being attached at such a high elevation on the tailgate 20 require a gas spring compliance large enough to satisfy the wide range of trailing axle travel that is allowed while in the active condition as earlier described. While also providing a relatively soft suspension for the trailing axle 36 without significantly detracting from the roll stabilizing effect made available with the pivotal connection of the actuators with the upper end of the tailgate.

And this is accomplished without the gas spring 128 by providing the gas pressure accumulator 96 with a volume sufficient in respect to the actuator gas springs 82 to accommodate the gas pressure reserve required to avoid fluctuating the gas and hydraulic pressure to a significant extent with the wide range of extension and retraction of the actuators 58 in accommodating the up and down trailing axle travel in the active condition as previously described. Or accomplishing the same desired effect with the addition of the gas spring 128 that operates in conjunction with the actuator gas springs 82 and allows the gas pressure accumulator 96 to then be of less volume than if it alone provided sufficient gas pressure reserve to provide for the up and down trailing axle travel in the active condition as previously described and prevention of significant gas and hydraulic pressure fluctuations.

The operating mechanism of the gas spring 128 is unlike that of the actuator gas springs 82 in being external of the actuators 58 and is for example mounted on the outer side of the tailgate 20 at the top thereof to conveniently connect with the actuators 58. And again referring to FIG. 25, the gas spring 128 comprises a cylindrical piston 132 having one end acted on by the hydraulic pressure delivered to the actuator hydraulic chambers 88 to deploy and establish the trailing axle 38 in the active condition and an opposite end of equal area acted on by the gas pressure in a chamber 134 that is charged with nitrogen like the gas accumulator 96 but has a significantly smaller static volume and is charged in its static condition at a significantly lower pressure. Whereby the gas chamber 134 serves as a low pressure accumulator and the gas accumulator 96 then serves as a high pressure gas accumulator. With the low pressure gas accumulator 134 thereby providing for the gas spring action provided by the actuators 58 in accommodating up and down trailing axle travel with actuator extension and retraction without significant gas and hydraulic pressure fluctuations occurring at relatively low hydraulic operating pressures when the trailing axle is playing a relatively minor role in helping to support the vehicle. And the high pressure gas accumulator 96 at relatively high hydraulic operating pressures beyond the pressure range of the low pressure gas accumulator then providing for the actuator gas spring action on the trailing axle in allowing the actuators to extend and retract to the same extent in accommodating the up and down trailing axle travel permitted without significant gas and hydraulic pressure fluctuation occurring when the trailing axle is playing a relatively major role in supporting the vehicle.

Having described the establishing of the trailing axle 36 in its active condition wherein the contribution to vehicle roll stability by the trailing axle suspension system 38 will be further described later, the trailing axle is established in its stowed condition by the PLC 130 on vehicle operator command by closing the Down Valve 124 and opening the associated Dump Valve 126, and opening the Up Valve 120 and closing the associated Dump Valve 122. Whereby the actuators 58 then retract and lift the trailing axle 36 to its stowed condition with the hydraulic pressure then being supplied from the manifold 116 to the actuator hydraulic chambers 90 with their other hydraulic chambers 88 then exhausted to the sump and the actuators thereby eventually fully retracted in establishing the stowed condition.

Having described the overall arrangement of the truck's suspension layout and the operation of the trailing axle in helping to support the vehicle, it will thus be appreciated that the actuators 58 are adapted to establish the axle in the stowed condition and active condition with hydraulically forced piston movement. Wherein in the active condition (a) the trailing axle 36 is forced by the hydraulically operated actuator pistons 80 to assist in supporting the vehicle frame 22 though the action of the actuator gas springs 82 alone or with the optional gas spring 128, (b) the actuator gas springs 82 alone or with the optional gas spring 128 allow a prescribed range of movement of the trailing axle relative to the vehicle frame in reaction to road grade changes at the steerable trailing axle wheels 32 and without significant gas and hydraulic pressure fluctuation and especially on encountering bumps and dips in a road surface that could adversely affect vehicle roll stability, (c) the carriage gas springs 82 and the actuator gas springs 82 alone or with the optional gas spring 128 effectively prevent shock forces on the steerable trailing axle wheels from being transmitted to the tailgate and thus to the vehicle frame, and (d) the carriage gas springs 82 and the actuators 58 with the actuator gas springs 82 alone or with the gas spring 128 resist movement of the vehicle frame 22 about its roll axis 34 at the pivotal connections of the actuators 58 with the tailgate 20 at locations at least above the highest possible center of gravity of the maximum allowable load where it is most effective in countering forces tending to tilt the truck frame about its roll axis.

Figure 26:
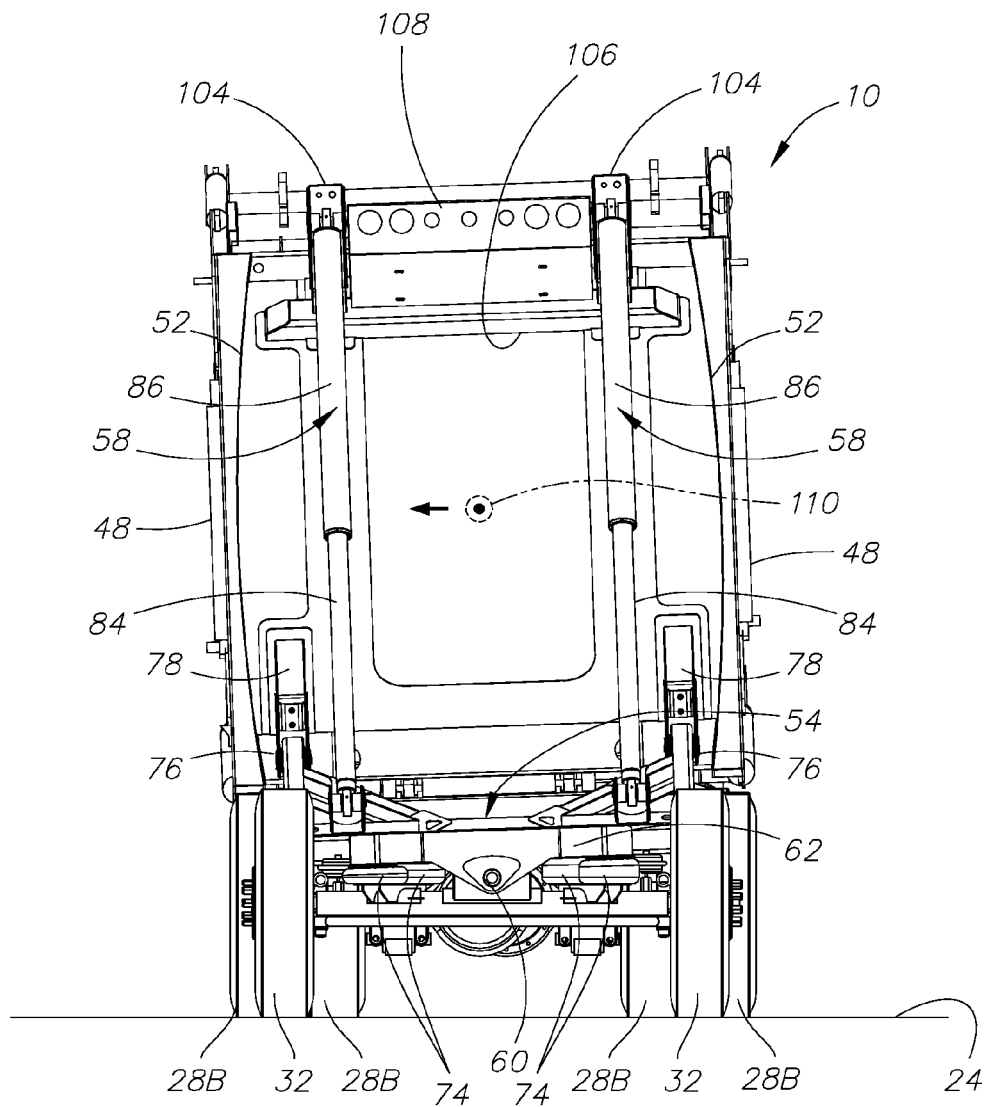
FIG. 26 is a view like FIG. 5 but with the trailing axle wheel fenders omitted and the truck frame being forced to tilt about its roll axis in the counter-clockwise direction because of centripetal force acting on the truck in the direction indicated.

Moreover, it was recognized that such roll stability action increases in effectiveness to a maximum when the pivotal connections of the actuators 58 with the tailgate 20 are located as high as road height restrictions permit as implemented in the exemplary embodiment. Wherein these connections are located above the top of the tailgate 20 but still below a typical road height restriction and thus at a maximum distance above the highest possible center of gravity of the maximum allowable load that occurs at approximately the location 110 in the exemplary embodiment. With the connection of the actuators 58 with the tailgate 20 thus at the highest elevation available to counter for example centripetal forces of a magnitude forcing the tilting of the vehicle frame 22 about its roll axis as shown in FIG. 26 and with the present invention serving to provide for such stabilizing action by the trailing axle suspension 38 in a highly effective manner in so limiting the extent of the rolling action.

As it was recognized in analyzing the potential contribution of a trailing axle to vehicle roll stability when suspending the axle from the tailgate that a significant contribution in providing for a counter-acting/balancing force occurs when this reactionary force is applied by the trailing axle actuators to the tailgate and thereby to the vehicle body at locations at least above the highest possible elevation of the center of gravity of the maximum allowable load where it is most effective to counter tilting forces on the truck frame such as when the vehicle is executing a curve at speed, experiencing high crosswinds and making a quick change in direction even at a relatively low speed. And this is taken full advantage of in the exemplary embodiment with the actuators 58 that are of relatively long extent compared to actuators with or without a gas spring that are normally used to operate a trailing axle with steerable wheels suspended from the tailgate and without regard to enhancing the effect of the actuators with respect to vehicle roll stability extent. Whereas the actuators 58 in their implementation are specifically directed to enhancing vehicle roll stability and to the fullest extent possible in the exemplary embodiment as allowed by road height restrictions.

While recognizing in analyzing the roll forces that are acting and with reference to FIGS. 19-22 that such beneficial results are obtained by having the pivotal connections of the actuators with the tailgate of the vehicle body located so that the minimum possible distance A in height between the roll axis 61 of the trailing axle and the pivotal connections 102 of the actuators with the tailgate 20 is always greater than the maximum distance B in height between the roll axis 34 of the vehicle frame and the center of gravity 110 of the maximum allowed load supported by the vehicle body. With this being illustrated in FIGS. 21 and 22 with the truck wheels and trailing axle wheels on a level road surface and then with the trailing axle wheels encountering a 20 inch high bump as illustrated in FIGS. 23 and 24. And with it being understood that in the exemplary embodiment that the enhanced roll stability of the vehicle frame provided by the trailing axle suspension system 38 has been maximized to the extent permitted by road height restrictions and in that it was found that significantly enhanced roll stability will occur as long as these parameters are followed in pivotally connecting the actuators to the tailgate at other elevated locations.

Moreover and with respect to the trailing axle stowed condition that is provided, it will be appreciated that the carriage 54 and trailing axle 36 are then located close to the fulcrum/pivot axis of the tailgate 20. And thus the tailgate 20 requires significantly less lifting force by the tailgate lift cylinders 48 then if the trailing axle was stowed on the tailgate at a remote location relative to the fulcrum of the tailgate such as close to the bottom end of the tailgate.

It will also be appreciated that having disclosed an exemplary embodiment of the invention, persons skilled in the art may arrive at various versions or modified forms of the invention constituting other embodiments including other suspension arrangements for suspending the trailing axle from the carriage and as adapted to other types of motor vehicles having a load-carrying body with a tailgate and is adapted to carry a load whose center of gravity will vary in elevation on the vehicle to a significant degree during vehicle usage. And therefore, the scope of the invention is intended to be limited only by the scope of the appended claims.

The invention claimed is:

1. A trailing axle suspension system for suspending a trailing axle with steerable wheels from a motor vehicle having a vehicle frame that is normally supported by primary axles with wheels and in turn supports a load-carrying vehicle body with a tailgate wherein the vehicle frame is supported for rolling movement relative to a vehicle frame roll axis and the maximum allowed load supported by the vehicle body has a center of gravity located below the vertical height of the vehicle body and substantially at or above the vertical mid-height of the vehicle body, said suspension system comprising a carriage from which the trailing axle is directly suspended wherein the carriage is pivotally connected to the tailgate and is adapted to locate the trailing axle in a stowed condition and in an active condition with the tailgate closed wherein the trailing axle in the active condition is located at a substantial distance behind the vehicle with the steerable wheels engaging a road surface and the trailing axle is supported for rolling movement relative to a trailing axle roll axis, a pair of hydraulically operated actuators pivotally connected at one end to the carriage and pivotally connected at an opposite end to the tailgate adapted to establish the trailing axle in the active condition wherein the actuators apply force on the trailing axle to help support the vehicle frame, gas springs adapted with the trailing axle in the active condition to allow a prescribed range of swinging movement of the trailing axle relative to the vehicle frame to accommodate differences in road grade between the trailing axle wheels and the wheels of the primary axles when the road grade at the trailing axle wheels is substantially below and above the road grade at the wheels of the primary axles, and the interrelationship of the carriage and the actuators and the gas springs being such that the minimum possible distance in height between the trailing axle roll axis and the actuator pivotal connections with the tailgate is always greater than the maximum distance in height between the vehicle frame roll axis and the center of gravity of the maximum allowed load supported by the vehicle body when the trailing axle is in the active condition and within the prescribed range of swinging movement of the trailing axle allowed by the gas springs.

2. A trailing axle suspension system as set forth in claim 1 wherein the actuators are pivotally connected to the tailgate at locations substantially above the vertical height of the vehicle body with the tailgate closed.

3. A trailing axle suspension system as set forth in claim 1 wherein the actuators are pivotally connected to the tailgate at locations substantially forward of the pivotal connection of the carriage with the tailgate and substantially above the vertical height of the vehicle body with the tailgate closed.

4. A trailing axle suspension system as set forth in claim 1 wherein the carriage is adapted to locate the trailing axle in the stowed condition adjacent a top end of the tailgate.

5. A trailing axle suspension system as set forth in claim 1 wherein the carriage is adapted to locate the trailing axle in the stowed condition adjacent a top end of the tailgate and overhead the pivotal connection of the carriage with the tailgate.

6. A trailing axle suspension system as set forth in claim 1 wherein the gas springs have a gas pressure accumulator mounted on the carriage.

7. A trailing axle suspension system as set forth in claim 1 wherein the trailing axle is pivotally mounted at a central location on the carriage, and cushioning between the carriage and the trailing axle is provided by gas springs arranged between the carriage and trailing axle on opposite sides of the pivotal mounting of the trailing axle.

8. A trailing axle suspension system as set forth in claim 1 wherein the trailing axle is pivotally mounted at a central location on the carriage, and cushioning between the carriage and trailing axle is provided by four gas springs arranged in pairs between the carriage and trailing axle on opposite sides of the pivotal mounting of the trailing axle.

9. A trailing axle suspension system as set forth in claim 1 wherein
the carriage is pivotally connected to the tailgate at locations substantially rearward of a bottom end of the tailgate with the tailgate closed, and
the actuators are pivotally connected to the tailgate at locations substantially rearward of a top end of the tailgate with the tailgate closed.

10. A trailing axle suspension system as set forth in claim 1 wherein
the carriage is pivotally connected to the tailgate at locations substantially rearward of a bottom end of the tailgate with the tailgate closed,
the actuators are pivotally connected to the tailgate at locations substantially rearward of a top end of the tailgate with the tailgate closed,
the carriage is adapted to locate the trailing axle in the stowed condition overhead the pivotal connection of the carriage with the tailgate with the tailgate closed, and
the actuators are adapted on full retraction to establish the trailing axle in the stowed condition.

11. A trailing axle suspension system as set forth in claim 1 wherein
the carriage has rigidly joined arms by which the carriage is pivotally connected at distal ends of the arms to the tailgate at locations substantially rearward of a bottom end of the tailgate with the tailgate closed,
the actuators are pivotally connected to the carriage at the arms, and
the actuators are pivotally connected to the tailgate at locations substantially rearward of a top end of the tailgate with the tailgate closed.

12. A trailing axle suspension system as set forth in claim 1 wherein
the actuators span the tailgate in the active condition.

13. A trailing axle suspension system as set forth in claim 1 wherein
the tailgate has a rearward facing side extending between and outward of a top end and a bottom end of the tailgate, and
the actuators are located outward of the rearward facing tailgate side.

14. A trailing axle suspension system as set forth in claim 1 wherein
the gas springs share a gas pressure accumulator mounted on the carriage.

15. A trailing axle suspension system as set forth in claim 1 wherein
the trailing axle is pivotally mounted at a central location on the carriage such that the trailing axle roll axis is in substantially parallel relationship with the vehicle frame roll axis when the trailing axle is in the active condition and experiencing no substantial difference in road grade between the trailing axle wheels and the wheels of the primary axles.

16. A trailing axle suspension system as set forth in claim 1 wherein
the gas springs are incorporated in the actuators and adapted to operate with the hydraulic pressure operating the actuators in applying force on the trailing axle while allowing the actuators to extend and retract in accommodating differences in road grade between the trailing axle wheels and the wheels of the primary axles.

17. A trailing axle suspension system as set forth in claim 1 wherein
the gas springs are incorporated in the actuators and adapted to operate with the hydraulic pressure operating the actuators in applying force on the trailing axle while allowing the actuators to extend and retract in accommodating differences in road grade between the trailing axle wheels and the wheels of the primary axles, and
cushioning between the carriage and trailing axle is provided by gas springs arranged between the carriage and trailing axle having a spring compliance substantially less than the gas springs incorporated in the actuators.

18. A trailing axle suspension system as set forth in claim 1 wherein
the gas springs are incorporated in the actuators and adapted to operate with the hydraulic pressure operating the actuators in applying force on the trailing axle while allowing the actuators to extend and retract in accommodating differences in road grade between the trailing axle wheels and the wheels of the primary axles,
the trailing axle is pivotally mounted at a central location on the carriage, and
cushioning between the carriage and trailing axle is provided by gas springs arranged between the carriage and trailing axle on opposite sides of the pivotal mounting of the trailing axle and have a spring compliance substantially less than the gas springs incorporated in the actuators.

19. A trailing axle suspension system as set forth in claim 1 wherein
the gas springs are incorporated in the actuators and adapted to operate with the hydraulic pressure operating the actuators in a prescribed hydraulic pressure operating range in applying force on the trailing axle while allowing the actuators to extend and retract independent of other spring action in accommodating differences in road grade between the trailing axle wheels and the wheels of the primary axles throughout the prescribed hydraulic pressure operating range.

20. A trailing axle suspension system as set forth in claim 1 wherein
the gas springs are incorporated in the actuators and together with an external gas spring operate with the hydraulic pressure operating the actuators in a prescribed hydraulic pressure operating range in applying force on the trailing axle while allowing the actuators to extend and retract in accommodating differences in road grade between the trailing axle wheels and the wheels of the primary axles throughout the prescribed hydraulic pressure operating range.

\* \* \* \* \*